United States Patent
Komiyama et al.

(10) Patent No.: US 12,182,787 B2
(45) Date of Patent: Dec. 31, 2024

(54) INFORMATION TERMINAL AND METHOD FOR RETAIL STORE TRANSACTIONS

(71) Applicant: TOSHIBA TEC KABUSHIKI KAISHA, Tokyo (JP)

(72) Inventors: Hikaru Komiyama, Yokohama Kanagawa (JP); Yumiko Okuma, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 287 days.

(21) Appl. No.: 17/944,076

(22) Filed: Sep. 13, 2022

(65) Prior Publication Data
US 2023/0094283 A1 Mar. 30, 2023

(30) Foreign Application Priority Data
Sep. 27, 2021 (JP) .................. 2021-156707

(51) Int. Cl.
*G06Q 20/20* (2012.01)
*G06F 3/04847* (2022.01)
*G06F 3/04886* (2022.01)
*G06Q 20/18* (2012.01)

(52) U.S. Cl.
CPC ....... *G06Q 20/208* (2013.01); *G06F 3/04847* (2013.01); *G06Q 20/18* (2013.01); *G06F 3/04886* (2013.01)

(58) Field of Classification Search
CPC ..... G06F 3/04886; G06F 3/048; G06Q 20/20; G06Q 10/087; G06Q 10/08; G06Q 30/0641
See application file for complete search history.

(56) References Cited

U.S. PATENT DOCUMENTS

| 11,270,283 | B2 * | 3/2022 | Barkan | G06K 7/1413 |
| 2010/0082447 | A1 * | 4/2010 | Lin | G06Q 30/0601 |
| | | | | 705/26.1 |
| 2016/0371633 | A1 * | 12/2016 | Stout | G06K 17/0022 |
| 2017/0116786 | A1 * | 4/2017 | Ramkumar | G06F 3/04842 |
| 2019/0035010 | A1 * | 1/2019 | Ittah | G06Q 30/0643 |

(Continued)

OTHER PUBLICATIONS

Scandit, "Scan Barcodes in a Web-based Intranet App with the Scandit Enterprise Browser", May 9, 2018, Youtube—https://www.youtube.com/watch?v=KASJZYYdLFU&list=PLP_VsATFcsq9GETNzhDfDXUAykkpuMbAn&index=8. (Year: 2018).*

*Primary Examiner* — Florian M Zeender
*Assistant Examiner* — Vanessa Deligi
(74) *Attorney, Agent, or Firm* — Kim & Stewart LLP

(57) ABSTRACT

An information terminal for a merchandise registration system includes a camera to read a code for identifying a merchandise item and a display to display a first screen for supporting the reading of the code. A processor transmits the code to a server and receives merchandise data corresponding to the code. The processor switches between a successive-reading mode and a single-reading mode when a setting of a mode operator displayed on the first screen is changed by a user. When in the successive-reading mode, the processor displays the corresponding merchandise data in a part of the first screen and permits successive reading of codes by the camera. When in the single-reading mode, the processor displays the merchandise data in a second screen that is different from the first screen.

20 Claims, 23 Drawing Sheets

(56) References Cited

U.S. PATENT DOCUMENTS

| | | | |
|---|---|---|---|
| 2020/0020012 A1* | 1/2020 | Kaliamurthy | G06Q 30/0625 |
| 2021/0192902 A1* | 6/2021 | Sasaki | G07G 1/0072 |
| 2021/0335052 A1* | 10/2021 | Jeong | G06T 19/006 |
| 2022/0129972 A1* | 4/2022 | Mathias | G06Q 20/208 |

* cited by examiner

FIG. 5

| MERCHANDISE CODE | MERCHANDISE NAME | PRICE | ATTRIBUTE |
|---|---|---|---|
|  |  |  |  |
|  |  |  |  |
|  |  |  |  |
| ⋮ | ⋮ | ⋮ | ⋮ |

61

| NUMBER OF ITEMS | AMOUNT OF DISCOUNT | ········ | F |
|---|---|---|---|
|  |  | ········ |  |
|  |  | ········ |  |
|  |  | ········ |  |
| ⋮ | ⋮ | ········ | ⋮ |

FIG. 6

| TOTAL NUMBER OF ITEMS | TOTAL AMOUNT | TOTAL AMOUNT OF DISCOUNT |
|---|---|---|
| Ta | Tb | Tc |

| No. | MERCHANDISE CODE | MERCHANDISE NAME | PRICE | ATTRIBUTE | NUMBER OF ITEMS | AMOUNT OF DISCOUNT |
|---|---|---|---|---|---|---|
| 1 | | | | | | |
| 2 | | | | | | |
| 3 | | | | | | |
| ⋮ | ⋮ | ⋮ | ⋮ | ⋮ | ⋮ | ⋮ |

FIG. 23C

REGISTRATION CHANGE

Press [OK] after chage

COMMODITY AAAAAA
TAX INCLUDED 8%　　　¥100

[ − ] [ 8 ] [ + ]
BTf　ARc　BTe

BTg: BACK WITHOUT CHANGE
BTh: OK

SCk

FIG. 23D

REGISTRATION IN PROGRESS

TOTAL  9 ITEMS　　¥1,000

COMMODITY AAAAAA
TAX INCLUDED 8%　¥100　[ 8 ]

COMMODITY BBBBBB
TAX INCLUDED 10%　¥200　[ 1 ]

BTb: NO BARCODE
BTa: SCAN
BTc: PAYMENT

SCl, ARa, ARb

FIG. 24

PAYMENT

TOTAL  9 ITEMS　　¥1,000

Scan code with payment machine

BC (barcode)

BTi: BACK

SCm, ARa

INFORMATION TERMINAL AND METHOD FOR RETAIL STORE TRANSACTIONS

CROSS-REFERENCE TO RELATED APPLICATION

This application is based upon and claims the benefit of priority from Japanese Patent Application No. 2021-156707, filed on Sep. 27, 2021, the entire contents of which are incorporated herein by reference.

FIELD

Embodiments described herein relate generally to an information terminal and a method for retail store sales transactions and the like.

BACKGROUND

A system that allows a customer (consumer) to scan a barcode attached to a merchandise, using an information terminal such as a smartphone or a tablet terminal, when purchasing the merchandise in a selling space where the merchandise is displayed is known. Such a system may be a self-service merchandise registration system. Introducing the self-service merchandise registration system in a supermarket or the like where a selling area and a payment area are typically separated from each other eliminates the need for a merchandise registration operation to be performed in the payment area and is therefore advantageous in that congestion in the payment area can be reduced.

The information terminal used in this type of self-service merchandise registration system generally provides a code reading function using a built-in camera. When the code reading function is enabled, a first screen showing a code reading area is displayed on a display of the information terminal. The customer holds the merchandise item to be purchased in front of the camera in such a way that the barcode fits within the reading area on the first screen. Thus, the barcode is scanned and the merchandise is registered for purchase. The image on the display then shifts to a second screen showing information about the just registered item such as the merchandise name, price, and the like. The customer can thus check at this time that the just registered merchandise has been correctly registered based on the information shown on the second screen.

In such information terminals, the shift to the second screen usually disables the code reading function. In such a case, the code reading function needs to be re-enabled for reading the code of the next item to be purchased. In some examples, the information terminal might not disable the code reading function after a merchandise reading but rather continue on in a state for reading the code of another item to be purchased. However, some customers would generally prefer to be able to check the details of registered items against the information that might otherwise be displayed on the second screen after reading of the code every time a code is read, but some customers would like to be able to successively read codes of items of merchandise to be purchased without interruption with the second screen display. Thus, for such self-service merchandise registration systems, where the customer executes a merchandise registration operation by himself or herself, a further improvement in the operability of the registration operation at the information terminal being operated by the customer is desired.

BRIEF DESCRIPTION OF THE DRAWINGS

FIG. 5 is a schematic view showing the configuration of a list area.
FIG. 6 is a schematic view showing the configuration of a total area.
FIG. 7 is a schematic view showing the configuration of a current area.
FIGS. 23A to 23D show an example of a screen transition.
FIG. 24 shows an example of a screen transition.

DETAILED DESCRIPTION

An embodiment described provides an information terminal that has improved operability when a customer in a selling area executes a code reading operation on an item of merchandise to be purchased.

In general, according to one embodiment, an information terminal, includes a communication interface connectable to a server, a camera to read a code for identifying an item of merchandise, and a display to display a first screen for supporting the reading of the code with the camera. A processor is configured to: transmit the code read by the camera to the server and receive merchandise data corresponding to the code from the server; switch between a successive-reading mode in which codes can be successively read by the camera and a single-reading mode in which codes cannot be successively read when a setting of a mode operator displayed on the first screen is changed by a user; cause the display to display the merchandise data received from the server in a part of the first screen and permit successive reading of codes by the camera when in the successive-reading mode; and cause the display to display the merchandise data received from the server in a second screen that is different from the first screen when in the single-reading mode.

An embodiment will now be described, using the drawings.

This embodiment applies to a case where, at a retail store where a selling area where merchandise is displayed and a payment area where a payment machine is installed are separated from each other, a customer (consumer) in the selling area executes a code reading operation on a merchandise item to be purchased by self-service using a portable information terminal. In this store, a merchandise registration system that supports self-service is provided. The information terminal is, for example, a smartphone owned by the customer, a dedicated portable terminal prepared in the store, a tablet terminal attached to a shopping cart, or the like. In this embodiment, the information terminal owned by the customer is employed as an example.

Description of Configuration of Merchandise Registration System

Figure 1:
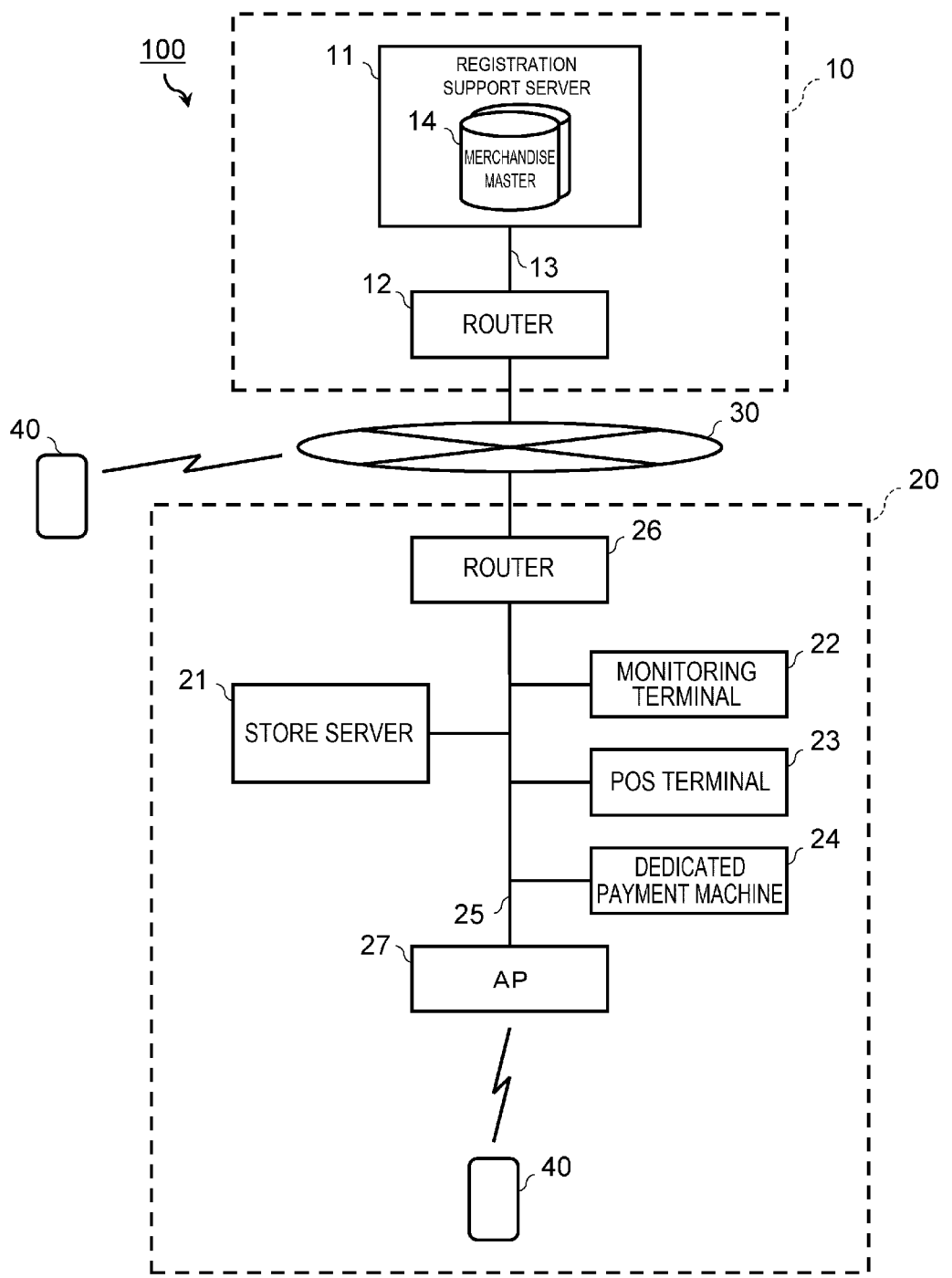
FIG. 1 is a block diagram of a merchandise registration system according to an embodiment.

FIG. 1 is a block diagram showing a schematic configuration of a merchandise registration system 100 according to this embodiment. The merchandise registration system 100 includes a server system 10 using cloud computing and a POS (point of sales) system 20 at a member store. The server system 10 and the POS system 20 can perform bidirectional data communication with each other via a network 30 using the internet protocol. The network 30 is a wide area network using a public line or a dedicated line as a relay network and using a wired LAN (local area network), a wireless LAN, a mobile communication network, a mobile phone communication network or the like as an access network. An information terminal 40 using a mobile phone communication network, for example, a smartphone, can access the server system 10 via the network 30.

A member store is a store that concluded a contract for use with the management company of the server system 10. In FIG. 1, the POS system 20 of one member store is illustrated. Of course, the POS systems of other member stores can similarly connect to the network 30. However, the POS systems of the other member stores need not necessarily have the same configuration as the POS system 20 shown in FIG. 1. The configuration of the POS system may partly differ, depending on the member store.

The server system 10 has a registration support server 11 and a router 12. The registration support server 11 and the router 12 are connected to each other via a communication line 13. The router 12 is also connected to the network 30 and serves as a relay point for data communication between the registration support server 11 and the POS system 20 of each member store via the network 30.

The registration support server 11 is a computer for supporting a registration service for a merchandise item to be purchased by a customer shopping at a member store. For this support, the registration support server 11 manages a merchandise master 14 on a per member store basis. The merchandise master 14 is an aggregate of merchandise records generated on a per merchandise item basis. A merchandise record is a data record in which merchandise information such as the merchandise name, price, and attribute of each merchandise is recorded in correlation with a merchandise code that is set on a per merchandise item basis in order to identify each individual item of merchandise available for purchase. An attribute in this context is, for example, information indicating whether a volume discount applies to the item or not, whether a reduced tax rate applies to the item or not, or the like.

The registration support server 11 has at least two functions described below. The first function is to perform registration processing on merchandise sales data, based on the code of a merchandise read by the information terminal 40. The second function is to generate or transmit payment data that is necessary for settlement of a transaction with the customer using the information terminal 40, in response to a payment instruction from the information terminal 40. That is, the registration support server 11 functions as a higher-level machine in relation to the information terminal 40.

The POS system 20 has a store server 21, a monitoring terminal 22, a POS terminal 23, and a dedicated payment machine 24. These elements are connected together via an in-store network 25. The POS system 20 also has a router 26 connected to the in-store network 25 and is connected to the network 30 via the router 26. The POS system 20 also has an access point 27 connected to the in-store network 25 and can perform data communication with the information terminal 40 by a wireless LAN via the access point 27.

The store server 21 is a computer for managing sales information of a member store where the POS system 20 is located, stock information and order information about merchandise, and the like, based on information about a transaction settled at the member store.

The monitoring terminal 22 is a terminal for monitoring a customer executing a code reading operation on a merchandise item to be purchased by self-service using the information terminal 40. The monitoring terminal 22 has a monitor. The behavior of the customer in the store, data about the merchandise item to be purchased by the customer, and the like, are displayed on the monitor.

The POS terminal 23 is a payment machine that processes the settlement of a transaction with a customer who does not use the information terminal 40. The operator of the POS terminal 23 is a sales clerk. The POS terminal 23 may be a semi-self-service-type POS terminal that is divided into a registration machine operated by the sales clerk and a payment machine operated by the customer. The POS terminal 23 may be a full-self-service-type POS terminal operated by the customer.

The dedicated payment machine 24 is a payment machine that processes the settlement of a transaction with a customer using the information terminal 40. The operator of the dedicated payment machine 24 is the customer. The dedicated payment machine 24 has a function of scanning a payment barcode displayed at the information terminal 40, a payment processing function corresponding to various payment methods such as payment by electronic money, by credit card or by cash, and an electronic money charging function or the like.

Description of Configuration of Registration Support Server

Figure 2:
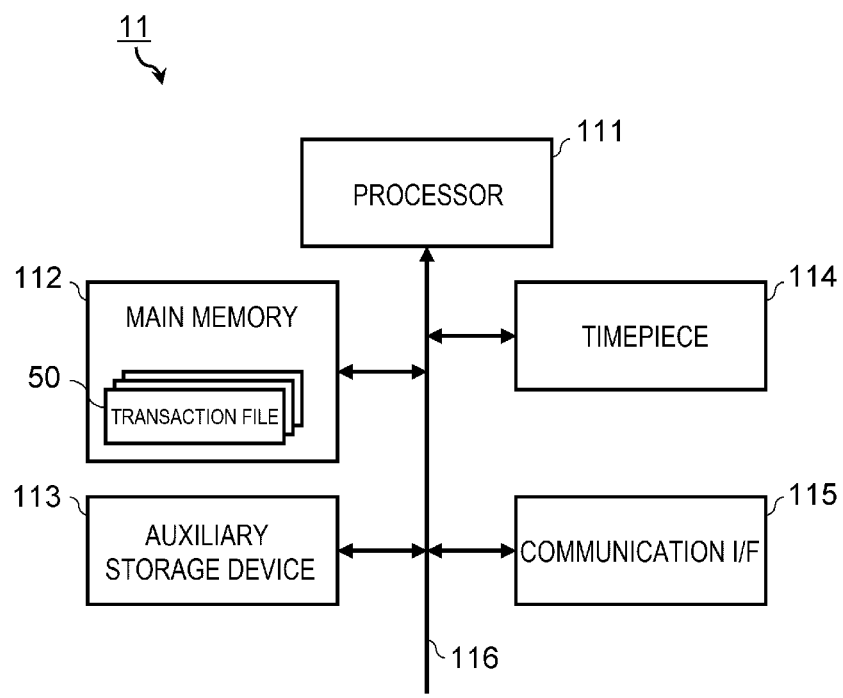
FIG. 2 is a block diagram of a registration support server.

FIG. 2 is a block diagram of the registration support server 11. The registration support server 11 has a processor 111, a main memory 112, an auxiliary memory device 113, a timepiece 114, a communication interface 115, and a system transmission line 116. The system transmission line 116 includes an address bus, a data bus, a control signal line, and the like. In the registration support server 11, the processor 111, the main memory 112, the auxiliary memory device 113, the timepiece 114, and the communication interface 115 are connected to the system transmission line 116.

The processor 111 controls components in order to implement various functions of the registration support server 11 according to an operating system and/or an application program. The processor 111 is a CPU (central processing unit), for example.

The main memory 112 includes a non-volatile memory area and a volatile memory area. The main memory 112 stores an operating system and/or an application program in the non-volatile memory area. The main memory 112 stores data that is necessary for the processor 111 to execute control processing in the volatile memory area. In some cases, the data may be stored in the non-volatile memory area. The volatile memory area in the main memory 112 is used as a work area where the processor 111 rewrites data when appropriate. The non-volatile memory area is a ROM (read-only memory), for example. The volatile memory area is an RAM (random-access memory), for example.

For example, an EEPROM (electrically erasable programmable read-only memory), an HDD (hard disc drive), or an SSD (solid-state drive) or the like can serve as the auxiliary memory device 113. The auxiliary memory device 113 saves data used by the processor 111 to execute various kinds of processing, or data generated as a result of processing by the processor 111, or the like. In some cases, the auxiliary memory device 113 may store the application program.

The timepiece 114 tracks the date and time. The registration support server 11 acquires the date and time tracked by the timepiece 114 as the current date and time.

The communication interface 115 is a circuit for transmitting and receiving data according to a predetermined communication protocol to and from each device connected via the network 30.

The registration support server 11 uses a part of the volatile memory area in the main memory 112 as a memory area for a plurality of transaction files 50. The transaction file 50 is generated on a per customer basis for customers executing a code reading operation on merchandise items to be purchased using the information terminal 40. In the transaction file 50, various data that are necessary for the generation of payment data are stored.

Figure 3:
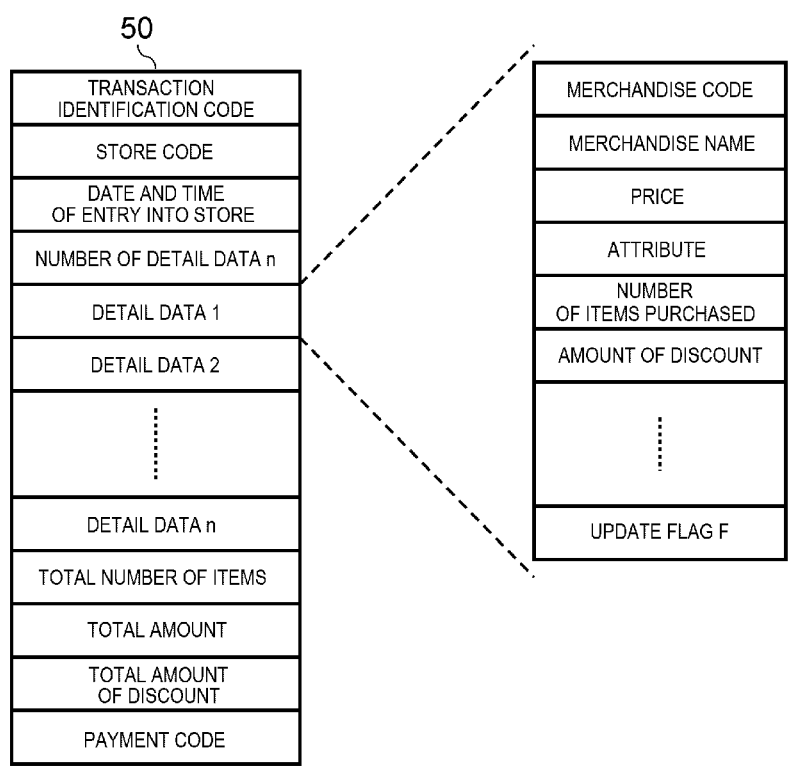
FIG. 3 is a schematic view showing principal data stored in a transaction file.

FIG. 3 is a schematic view showing principal data stored in the transaction file 50. FIG. 3 shows data of one record in a plurality of transaction records stored in the transaction file 50. The transaction file 50 stores data about a transaction by the customer using the information terminal 40. As shown in FIG. 3, a transaction identification code, a store code, date and time of entry into the store, a number of detail data n, detail data corresponding to the number n, a total number of items, a total amount, a total amount of discount, a payment code, and the like, are stored in the transaction file 50.

The transaction identification code is information for identifying the transaction by the customer. The transaction identification code may be, for example, a code for identifying the information terminal 40 used by the customer. For example, the device ID, the mobile phone number or the like of the information terminal 40 can be the transaction identification code. The transaction identification code may be, for example, a transaction number for identifying the transaction or may be a combination of the transaction number, the store code, and date and time information such as the date and time of entry into the store. The transaction number is issued by the registration support server 11, for example, when generating a transaction file, described later. The store code is a unique code set on a per member store basis in order to identify each individual member store. The date and time of entry into the store is the date and time when the customer starts an application for the merchandise registration system operating on the information terminal 40 and checks in to the member store.

The detail data is formed by a merchandise code of the merchandise item to be purchased, a merchandise name, a price, an attribute, a number of items purchased, an amount of discount, and the like. The detail data includes an update flag F. The update flag F is 1-bit data for identifying whether the detail data is updated data or not. In this embodiment, the update flag F of updated detail data is "1" and the update flag F of detail data that is not updated is "0".

The total number of items is the sum of the numbers of items purchased included in the individual detail data. The total amount is the sum of the amounts of purchase included in the individual detail data. The amount of purchase is calculated by multiplying the price by the number of items purchased minus the amount of discount. The total amount of discount is the sum of the amounts of discount included in the individual detail data. The payment code is a code which a customer who checked in to the member store specified by the store code, using the information terminal 40, at the date and time of entry into the store, uses for the payment in the transaction.

Description of Configuration of Information Terminal

Figure 4:
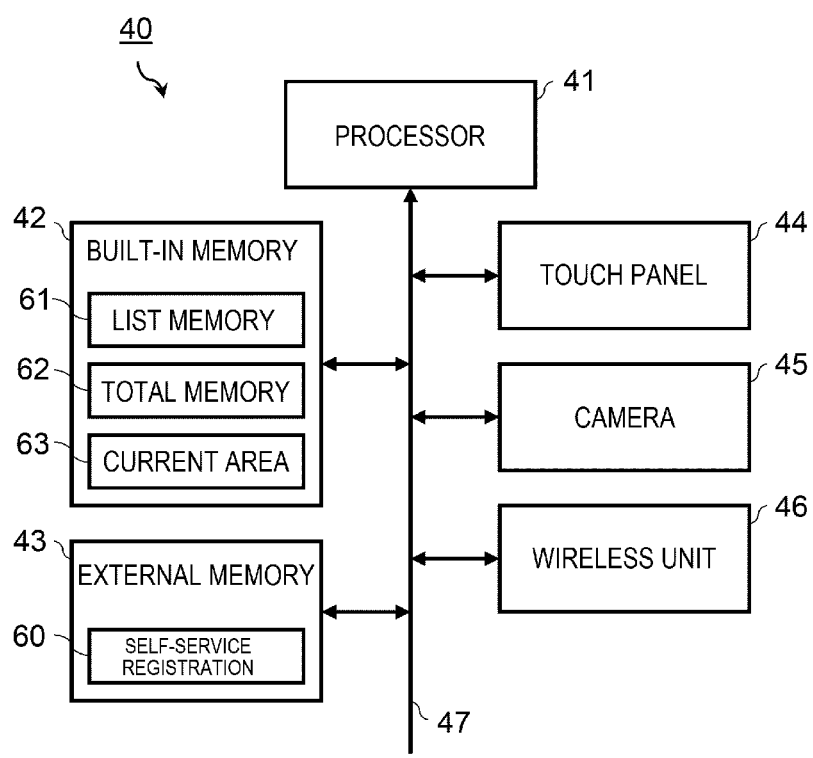
FIG. 4 is a block diagram of an information terminal.
Figure 8:
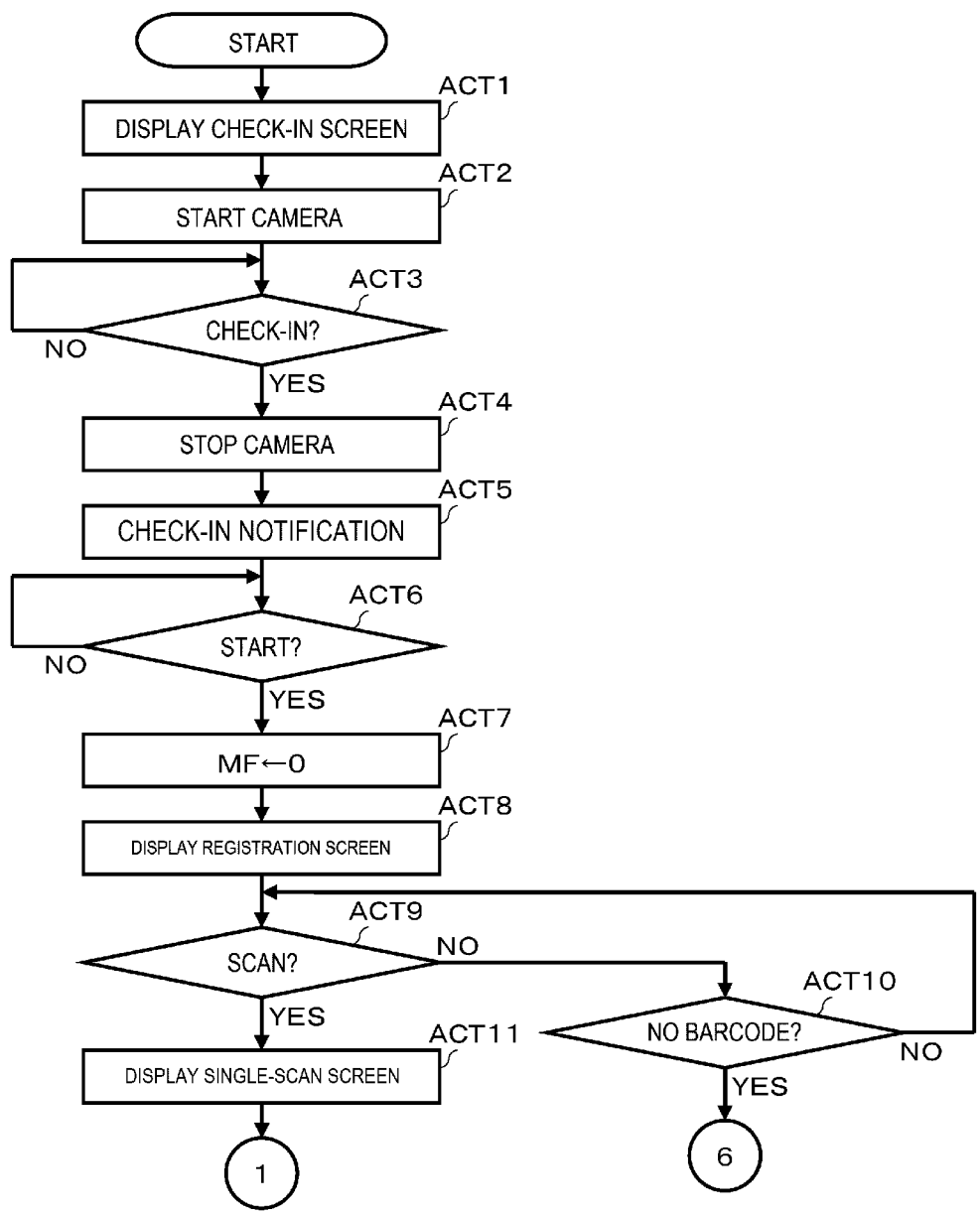
FIGS. 8 to 15 are flowcharts of information processing executed by a processor of an information terminal.

FIG. 4 is a block diagram of the information terminal 40. As shown in FIG. 4, the information terminal 40 has a processor 41, a built-in memory 42, an external memory 43, a touch panel 44, a camera 45, a wireless unit 46, and a system transmission line 47.

The system transmission line 47 includes an address bus, a data bus, a control signal line, and the like. In the information terminal 40, the processor 41, the built-in memory 42, the external memory 43, the touch panel 44, the camera 45, and the wireless unit 46 are connected to the system transmission line 47.

The processor 41 is equivalent to a central part of the computer. The processor 41 controls components in order to implement various functions of the information terminal 40 according to an operating system and/or an application program (application software). The processor 41 is a CPU, for example.

The built-in memory 42 includes a non-volatile memory area and a volatile memory area. The built-in memory 42 stores an operating system and/or an application program in the non-volatile memory area. The built-in memory 42 stores data that is necessary for the processor 41 to execute processing to control each part, in the volatile memory area. The volatile memory area in the built-in memory 42 is used as a work area where the processor 41 rewrites data when appropriate. The non-volatile memory area is a ROM, for example. The volatile memory area is an RAM, for example.

For example, an SD memory card, a USB memory or the like can be the external memory 43. The external memory 43 saves data used by the processor 41 to execute various kinds of processing, or data generated as a result of processing by the processor 41, or the like. In some cases, the external memory 43 may store the application program.

The touch panel 44 is a device formed by a combination of a display and a touch sensor. The display has a screen for displaying various images. The touch sensor detects a position on the screen touched by the operator. The touch panel 44 acquires data inputted by an operator based on the position on the screen detected as touched by the touch sensor and information of the image displayed at that position.

The camera 45 is built in the information terminal 40. The processor 41 reads a code such as a barcode or a two-dimensional code from the image provided by the camera 45. The processor 41 in cooperation with the camera 45 forms a reading unit.

The wireless unit 46 is a communication device performing data communication with the access point 27 according to a wireless LAN communication protocol. The wireless unit 46 forms a communication unit of the information terminal 40.

In the information terminal 40 having such a configuration, for example, a self-service registration program 60 is installed in the external memory 43. The self-service registration program 60 is application software for the merchandise registration system executed by the information terminal 40. The self-service registration program 60 may be installed in the built-in memory 42. The method for installing the self-service registration program 60 in the built-in memory 42 or the external memory 43 is not particularly limited. The self-service registration program 60 can be recorded in a removable recording medium or distributed by communication via a network and then can be installed in the built-in memory 42 or the external memory 43. The recording medium is not limited to any particular form, provided that the recording medium can store a program and is readable by a device, like an SD memory card, a USB memory or the like.

In the information terminal 40 with the self-service registration program 60 installed therein, a list area 61, a total area 62, and a current area 63 are formed in a part of the built-in memory 42. The areas 61, 62, 63 may be formed in the external memory 43.

Figure 5:
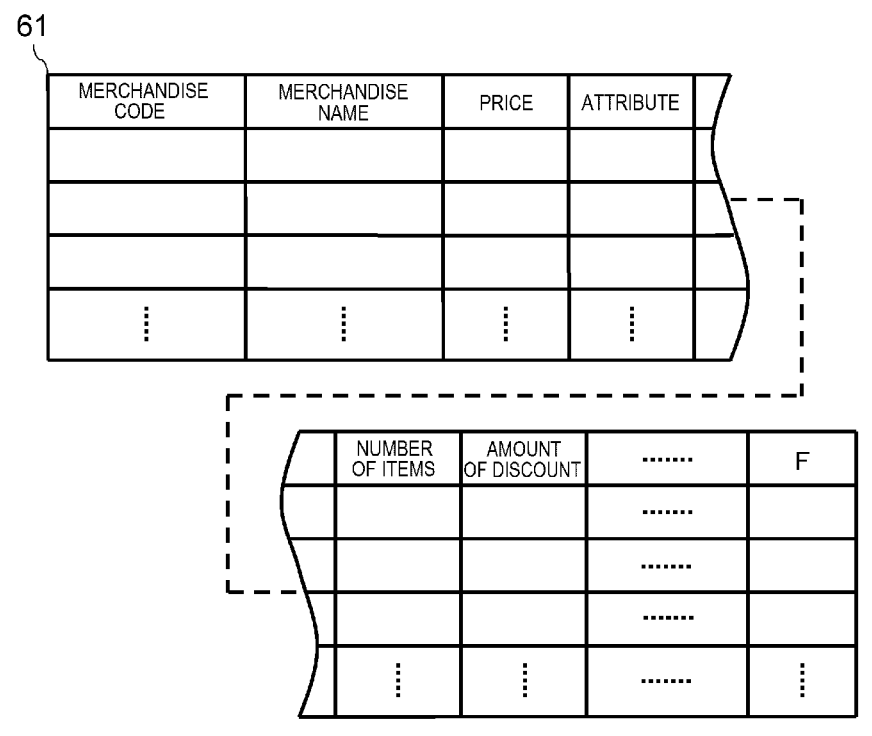

FIG. 5 is a schematic view showing the configuration of the list area 61. As shown in FIG. 5, the list area 61 is an area for storing the detail data such as the merchandise code, the merchandise name, the price, the attribute, the number of items purchased, the amount of discount, and the update flag F.

FIG. 6 is a schematic view showing the configuration of the total area 62. As shown in FIG. 6, the total area is an area for storing a total number of items Ta, a total amount Tb, and a total amount of discount Tc.

FIG. 7 is a schematic view showing the configuration of the current area 63. As shown in FIG. 7, the current area 63 is an area for storing the data such as the merchandise code, the merchandise name, the price, the attribute, the number of items purchased, and the amount of discount in correlation with serial numbers starting with "1".

The processor 41 executes information processing according to the self-service registration program 60 and thus implements functions as a switching unit, a control unit, an extraction unit, and a clearing unit. The switching unit is the function of switching between a successive-scan mode (successive-reading mode) in which barcodes can be successively read by the reading unit using the camera 45 and a single-scan mode (single-reading mode) in which barcodes cannot be successively read. The control unit is the function of, when in the successive-scan mode, causing the touch panel 44, which is the display unit, to display the merchandise data received by the wireless unit 46, which is the communication unit, in a part of a scan screen, which is the first screen, and enabling successive reading of barcodes by the reading unit, and when in the single-scan mode, causing the touch panel 44, which is the display unit, to display the merchandise data received by the wireless unit 46, which is the communication unit, in a registration screen, which is the second screen that is different from the first screen, and disabling the successive reading of barcodes by the reading unit. The extraction unit is the function of extracting merchandise data about a merchandise specified by the latest barcode read by the reading unit, from among the merchandise data received by the communication unit. The clearing unit is the function of clearing the merchandise data stored in the current area 63, which is a memory unit, when a first instruction unit giving an instruction to transition the image on the touch panel 44 from the scan screen to the registration screen or a second instruction unit giving an instruction to transition the image from the registration screen to the scan screen gives an instruction to transition the screen. Details of these functions will be clarified in the description of operations given below.

Description of Operations of Merchandise Registration System

FIGS. 8 to 15 are flowcharts of the information processing executed by the processor 41 of the information terminal 40 according to the self-service registration program 60. FIGS. 16 to 20 are flowcharts of the information processing executed by the processor 111 of the registration support server 11. FIGS. 21A-21D to FIG. 24 show an example of transitions of the screens displayed on the touch panel 44 of the information terminal 40. Principal operations of the merchandise registration system will be described below, using these illustrations. The procedures and contents of the operations described below are only a description example. The procedures or contents can be suitably changed, provided that similar effects can be achieved. The depicted screens are also only examples. The layout, image, text or the like on each screen is not limited to the illustrated examples.

A customer shopping by using the information terminal 40 at a retail store where the self-service merchandise registration system 100 is provided, first starts the self-service registration program 60. When the self-service registration program 60 is started, the processor 41 of the information terminal 40 starts the information processing according to the procedures shown in FIG. 8. In ACT 1, the processor 41 causes the touch panel 44 to display a check-in screen SCa (see FIG. 21A). In ACT 2, the processor 41 starts the camera 45.

At the entrance of the store, a code for entry is prepared. The code for entry is setting information about the store coded by a two-dimensional code system. The setting information includes a store code, in-store LAN data, mobile communication data, and the like. The in-store LAN data is an SSID, a password, security information, and the like that are necessary for the information terminal 40 to connect to the access point 27, using a wireless LAN. The mobile communication data is a time-out period, a number of retries, and the like that are necessary for the information terminal 40 to communicate with each device in the self-service merchandise registration system 100.

Figure 21A:
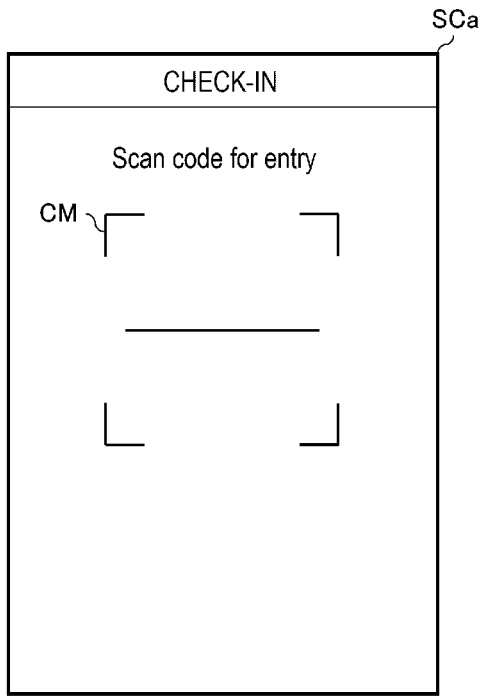
FIGS. 21A to 21D show an example of a screen transition at an information terminal.

As shown in FIG. 21A, a guidance that guides the customer to scan the code for entry, and a frame CM showing a code reading area, are arranged in the check-in screen SCa. The customer holds the camera 45 of the information terminal 40 over the code for entry in such a way that the code for entry fits in the frame CM. Thus, the code for entry is read by the function of the reading unit of the information terminal 40.

In the above description, the camera 45 starts at the timing when the check-in screen SCa is displayed on the touch panel 44. However, the timing of the start of the camera 45 is not limited to this example. For example, a camera start button may be displayed in the check-in screen SCa and a touch operation on the camera start button may start the camera 45.

The processor 41, displayed the check-in screen SCa, waits for check-in in ACT 3. When the camera 45 scans the code for entry, the processor 41 determines that check-in is executed, and therefore proceeds to ACT 4. In ACT 4, the processor 41 stops the camera 45.

In ACT 5, the processor 41 controls the wireless unit 46 to send a check-in notification. By this control, the wireless unit 46 connects to the access point 27 via a wireless LAN, based on in-store LAN data acquired from the code for entry. After connecting to the access point 27, the wireless unit 46 wirelessly transmits a check-in notification command. The check-in notification command is received at the access point 27 and transmitted to the registration support server 11 via the router 26 of the POS system 20. The check-in notification command includes a terminal identification code that is set for the information terminal 40. The terminal identification code may be, for example, a code for identifying the information terminal 40 used by the customer. For example, the device ID, the mobile phone number or the like of the information terminal 40 can be the terminal identification code. Alternatively, the terminal identification code may be a code for identifying the self-service registration program 60 stored in the information terminal 40 or the user using this program and may be, for example, a unique number automatically issued when the program is installed or a membership number issued when the customer carries out membership registration. The check-in notification command also includes a store code acquired from the code for entry. The registration support server 11, received the check-in notification command, executes check-in notification processing.

Figure 16:
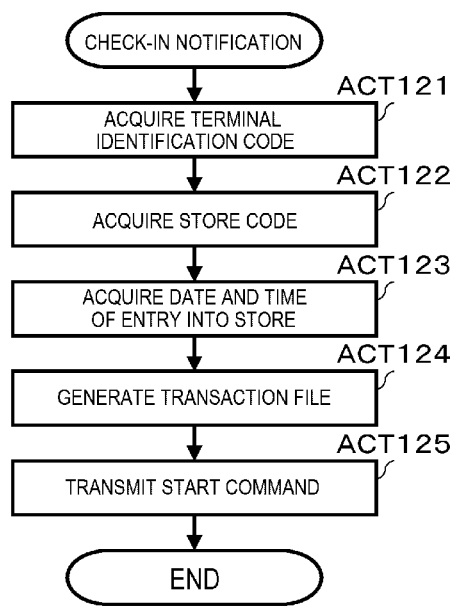
FIG. 16 is a flowchart of check-in notification processing executed by a processor of a registration support server.

FIG. 16 is a flowchart of the check-in notification processing. On receiving the check-in notification command via the communication interface 115, the processor 111 of the registration support server 11 acquires the terminal identification code from the check-in notification command in ACT 121. In ACT 122, the processor 111 acquires the store ID from the check-in notification command. In ACT 123, the processor 111 defines the current date and time tracked by the timepiece 114 as the date and time of entry into the store. In ACT 124, the processor 111 generates the transaction file 50. In the transaction file 50, a transaction identification code, the store code acquired from the check-in notification command, and the date and time of entry into the store are saved. The transaction identification code may be the terminal identification code acquired from the check-in notification command. The transaction file 50 is stored in the main memory 112, for example.

In ACT 125, the processor 111 transmits a start command to the information terminal 40 that is transmission source of the check-in notification command, for example, based on the terminal identification code. If a transaction number is used as the transaction identification code, the transaction identification code using the transaction number may be included in the start command and this start command may be transmitted to the information terminal 40. In this case, the information terminal 40 can include the transaction identification code into a registration notification command, described later, when registering a merchandise, and the registration support server 11 can manage information about the merchandise registered by the customer, based on the transaction identification code. The processor 111 then ends the information processing corresponding to the reception of the check-in notification command. In the above description, the processor 111 generates the transaction file 50 in ACT 124. However, the timing of generating the transaction file 50 is not limited to this example. The processor 111 may generate the transaction file 50 on receiving a merchandise code transmitted as the registration notification command when the information terminal 40 scans the barcode of the first merchandise in a new transaction.

Referring back to FIG. 8, the processor 41 sent the check-in notification waits for the start command in ACT 6. On receiving the start command via the wireless unit 46, the processor 41 proceeds to ACT 7. In ACT 7, the processor 41 sets a mode flag MF to "0".

The mode flag MF is 1-bit data for identifying whether the operation mode of the information terminal 40 is the successive-scan mode or the single-scan mode. The successive-scan mode is a mode in which the barcodes of a plurality of merchandise can be successively read by the reading unit. The single-scan mode is a mode in which the barcode of one merchandise is read by the reading unit each time. In the single-scan mode, the barcodes of a plurality of merchandise cannot be successively read. In this embodiment, the mode flag indicating the successive-scan mode is "1" and the mode flag indicating the single-scan mode is "0". That is, at the initial stage where check-in is carried out, the information terminal 40 is set to the single-scan mode.

Figure 21B:
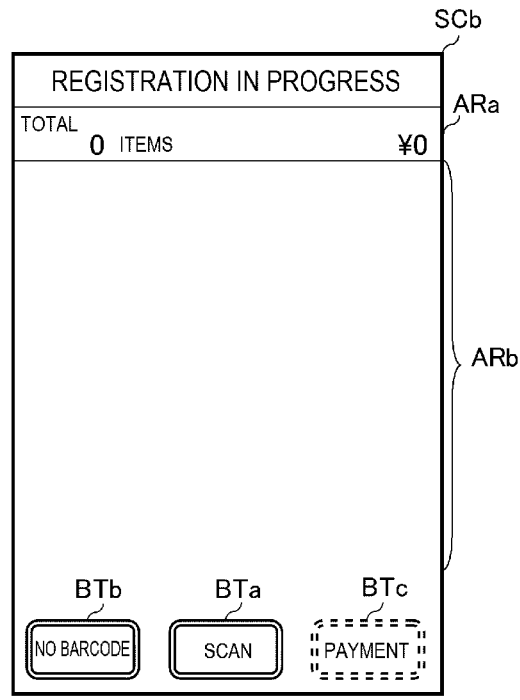

The processor 41 set the mode flag MF to "0" switches the screen on the touch panel 44 from the check-in screen SCa to a registration screen SCb (see FIG. 21B) in ACT 8. As shown in FIG. 21B, a scan button BTa, a no-barcode button BTb, and a payment button BTc are arranged in the registration screen SCb. Also, a part of the screen is defined as a total display part ARa for the transaction and the rest of the screen is defined as a detail list display part ARb for the merchandise item to be purchased. At this point, the shopping does not begin and therefore the total number of items is 0 and the total amount is 0 yen. The detail list display part ARb is blank.

The scan button BTa is an operating element for giving an instruction to scan the barcode attached to a merchandise. The no-barcode button BTb is an operating element for giving an instruction to register a merchandise without a barcode. The payment button BTc is an operating element for giving an instruction to pay the price for the transaction. At this point, the shopping does not begin and therefore the payment button BTc is grayed out and disabled. The registration screen SCb with the disabled payment button BTc may also be referred to as a registration start screen.

The customer checked the registration screen SCb begins shopping. As the customer goes around in the selling area and finds a merchandise item to be purchased, the customer checks whether a barcode is attached to the item or not. If a barcode is attached to the item, the customer touches the scan button BTa. If a barcode is not attached to the item, the customer touches the no-barcode button BTb.

The processor 41 waits until the scan button BTa is pressed in ACT 9 or the no-barcode button BTb is pressed in ACT 10. If the scan button BTa is pressed in the waiting state of ACTs 9 and 10, the processor 41 proceeds to ACT 11. In ACT 11, the processor 41 switches the screen on the touch panel 44 from the registration screen SCb to a scan screen SCc corresponding to the single-scan mode (see FIG. 21C). The processor 41 then proceeds to ACT 12 in FIG. 9. In ACT 12, the processor 41 starts the camera 45.

Figure 21C:
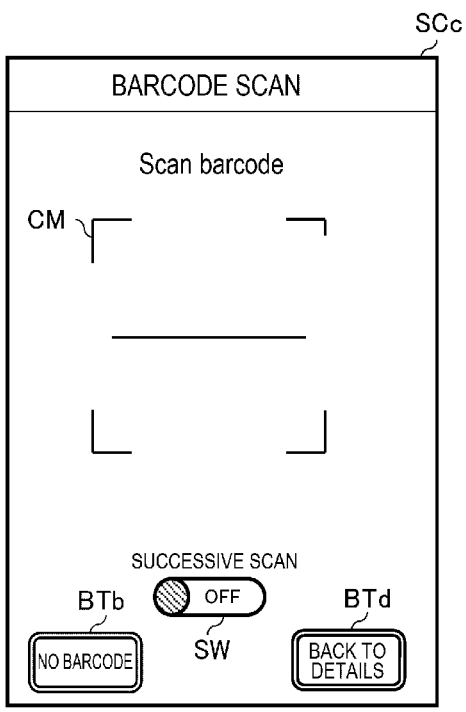

As shown in FIG. 21C, a guidance that guides the customer to scan the barcode of the merchandise, and a frame CM showing a code reading area, are arranged in the scan screen SCc corresponding to the single-scan mode. Also, the no-barcode button BTb and a back-to-details button BTd are arranged in the scan screen SCc. The back-to-details button BTd is an operating element for giving an instruction to return to the registration screen. The code reading area is an image for supporting the reading of the barcode. That is, the scan screen SCc is an example of the first screen.

Also, a mode changing switch SW is arranged in the scan screen SCc. The mode changing switch SW is a switch for switching between the single-scan mode and the successive-scan mode. The scan screen SCc is a screen corresponding to the single-scan mode. Therefore, an [OFF] mark shown at the mode changing switch SW indicates that the single-scan mode is selected.

The customer checked the scan screen SCc decides whether to change the mode to the successive-scan mode or not. If the customer does not change the mode to the successive-scan mode, that is, if the barcode on the merchandise item to be purchased is to be read in the single-scan mode, the customer holds the camera 45 of the information terminal 40 over the merchandise item to be purchased in such a way that the barcode fits within the frame CM. Thus, the barcode is read by the function of the reading unit of the information terminal 40. If a barcode is not attached to the merchandise item to be purchased, the customer touches the no-barcode button BTb. If the screen is to return to the registration screen SCb, the customer touches the back-to-details button BTd. However, if the customer wants to change the mode to the successive-scan mode, the customer switches the mode changing switch SW.

The processor 41 waits until a barcode is read in ACT 13, the no-barcode button BTb is pressed in ACT 14, the back-to-details button BTd is pressed in ACT 15, or the mode changing switch SW is switched in ACT 16.

Figure 10:
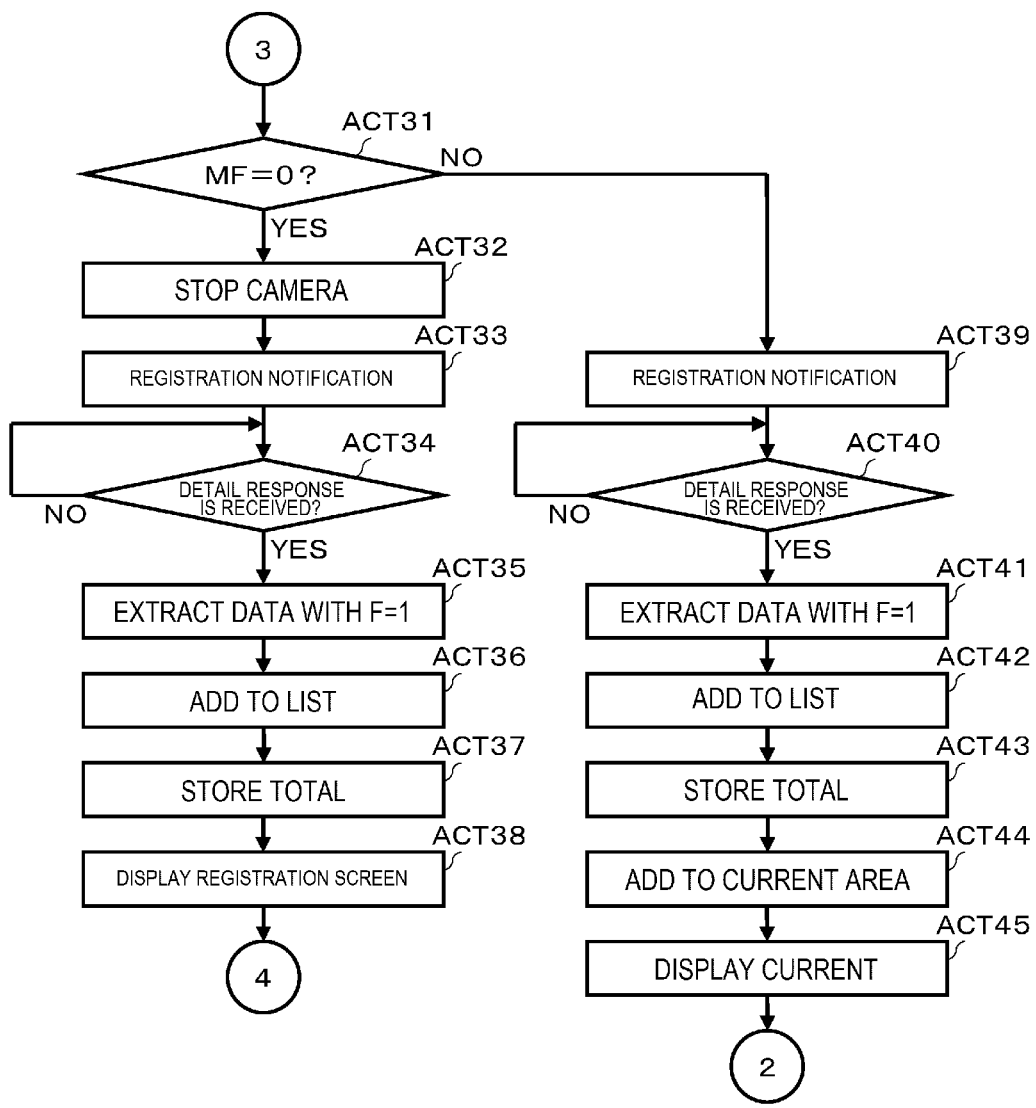

If the barcode is read in the waiting state of ACTs 13 to 16, the processor 41 proceeds to ACT 31 in FIG. 10. In ACT 31, the processor 41 checks the mode flag MF. In this case, the mode flag MF is "0" and therefore the processor 41 proceeds to ACT 32. In ACT 32, the processor 41 stops the camera 45. In ACT 33, the processor 41 controls the wireless unit 46 to send a registration notification. By this control, the wireless unit 46 wirelessly transmits a registration notification command. The registration notification command is received at the access point 27 and transmitted to the registration support server 11 via the router 26 of the POS system 20. The registration notification command includes data of the barcode read from the merchandise item to be purchased. The registration notification command also includes a transaction identification code, which is information for identifying the transaction by the customer in the transaction file 50. For example, if the transaction identification code is the terminal identification code, the registration notification command includes the terminal identification code that is set for the information terminal 40.

The registration support server 11 then executes registration notification processing.

Figure 17:
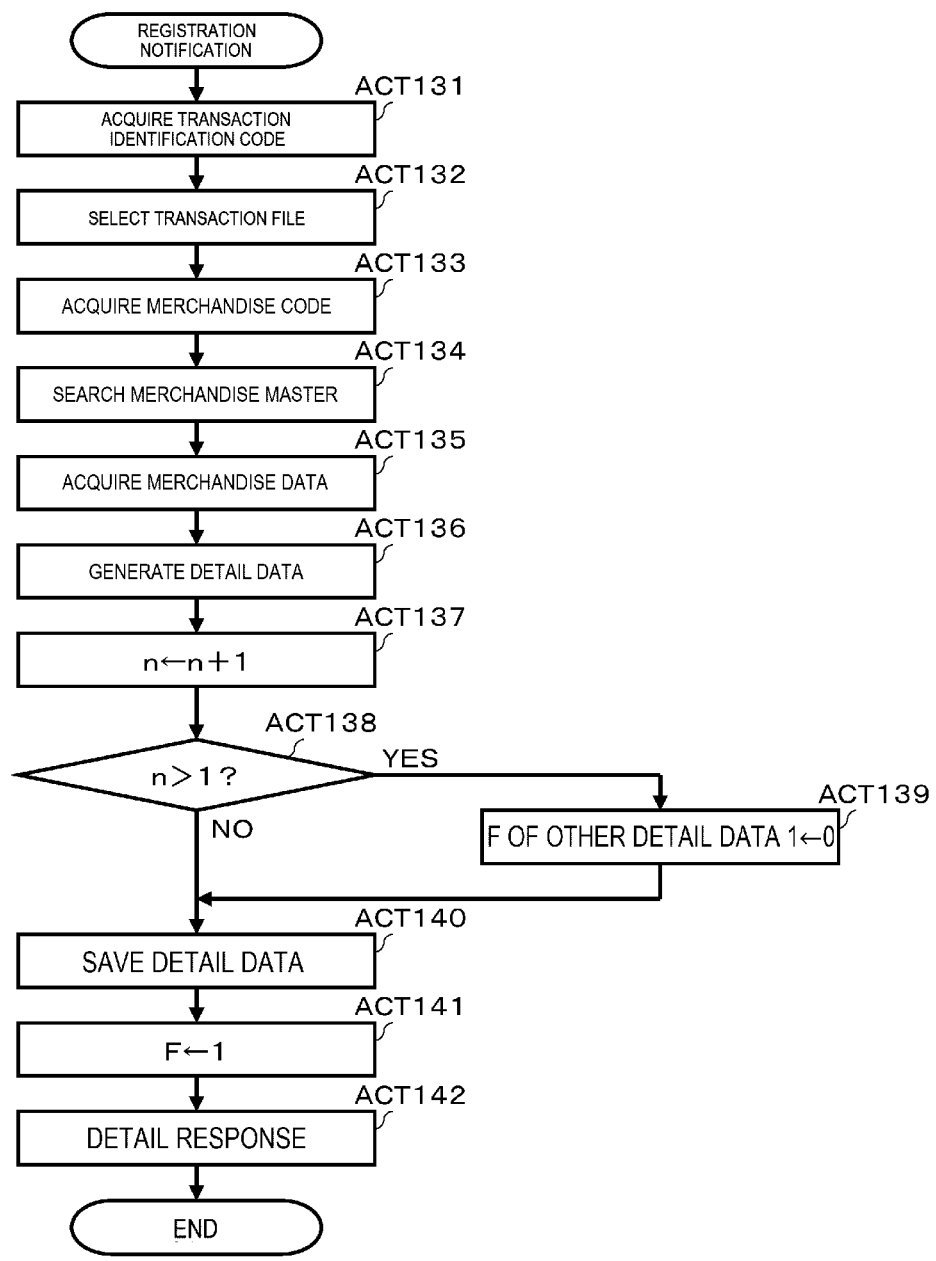
FIG. 17 is a flowchart of registration notification processing.

FIG. 17 is a flowchart of the registration notification processing. On receiving the registration notification command via the communication interface 115, the processor 111 of the registration support server 11 acquires the transaction identification code from the registration notification command in ACT 131. In ACT 132, the processor 111 selects the transaction file 50 where this transaction identification code is saved. Hereinafter, the selected transaction file is referred to as a transaction file 51 for the sake of convenience of the description.

In ACT 133, the processor 111 acquires the merchandise code from the data of the barcode included in the registration notification command. In ACT 134, the processor 111 searches the merchandise master 14 for the merchandise code. At this point, the processor 111 searches the merchandise master 14 of the member store identified by the store code saved in the transaction file 51.

In ACT 135, the processor 111 reads out the merchandise data such as the merchandise name, the price, and the attribute, stored in correlation with the merchandise code, from the merchandise master 14. In ACT 136, the processor 111 generates the detail data of the merchandise item to be purchased. The detail data is formed by the merchandise code, the merchandise name, the price, the attribute, the number of items purchased, the amount of discount, the update flag F, and the like, of the merchandise item to be purchased, as described above.

In ACT 137, the processor 111 adds "1" to the number of detail data n of the transaction file 51. The processor 111 then checks whether the number of detail data n is greater than "1" or not. If the number of detail data n is greater than "1", the processor 111 proceeds to ACT 139. That the number of detail data n is greater than "1" means that other detail data are saved in the transaction file 51. In ACT 139, the processor 111 resets the update flag F of the other detail data to "0". The processor 111 then proceeds to ACT 140. However, if the number of detail data n is "1", that is, if no other detail data are saved in the transaction file 51, the processor 111 skips the processing of ACT 139 and proceeds to ACT 140. In ACT 140, the processor 111 saves the detail data generated in ACT 136, in the transaction file 51. In ACT 141, the processor 111 sets the update flag F of the detail data to "1".

After finishing the above processing, the processor 111 transmits a detail response command to the information terminal 40 that is the transmission source of the registration notification command, in ACT 142. The detail response command includes the detail data corresponding to the number of detail data n, the total number of items, the total amount, and the total amount of discount or the like saved in the transaction file 51.

Referring back to FIG. 10, the processor 41 that controlled the transmission of the registration notification command now waits for the detail response command in ACT 34. On receiving the detail response command via the wireless unit 46, the processor 41 proceeds to ACT 35. In ACT 35, the processor 41 extracts the detail data with the update flag F set to "1", from the detail response command. In ACT 36, the processor 41 adds the detail data to the list area 61. In ACT 37, the processor 41 acquires the total number of items, the total amount, and the total amount of discount from the detail response command and overwrites the total area 62 with these.

Figure 21D:
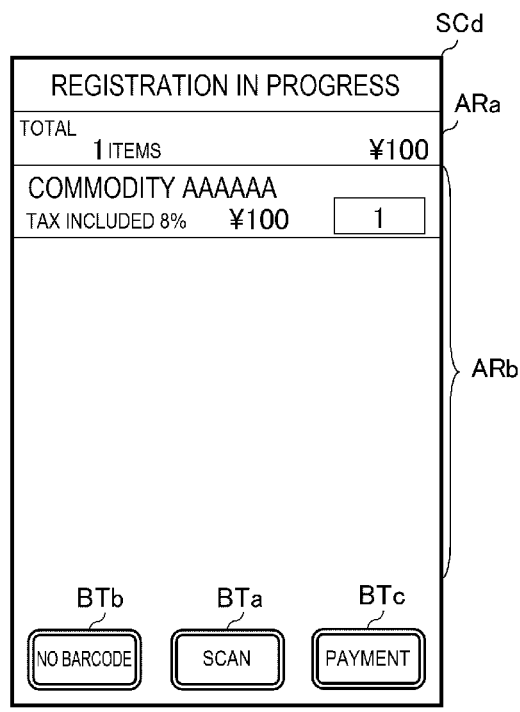

Then, in ACT 38, the processor 41 switches the screen on the touch panel 44 from the scan screen SCc corresponding to the single-scan mode to a registration screen SCd (see FIG. 21D). The registration screen SCd displays a screen including a list (a registered merchandise list) with information about all the merchandise whose barcodes have been scanned (registered for purchase), the total number of items, and the total amount. That is, the registration screen is a merchandise detail screen showing information about all the merchandise registered for purchase. The registration screen SCd is an example of the screen corresponding to the case where the barcode of the first item of the merchandise to be purchased is scanned. In the total display part ARa, the total amount of items and the total amount stored in the total area 62 are displayed. If the total amount of discount is greater than 0 yen, the total amount of discount is also displayed at a part of the total display part ARa. In the detail list display part ARb, the merchandise name (merchandise AAAAAA), the price (¥100), and the number of items purchased ([1]) or the like of the merchandise item to be purchased are displayed for each item, based on the detail data stored in the list area 61. That is, the registration screen SCd is an example of the second screen.

Figure 11:
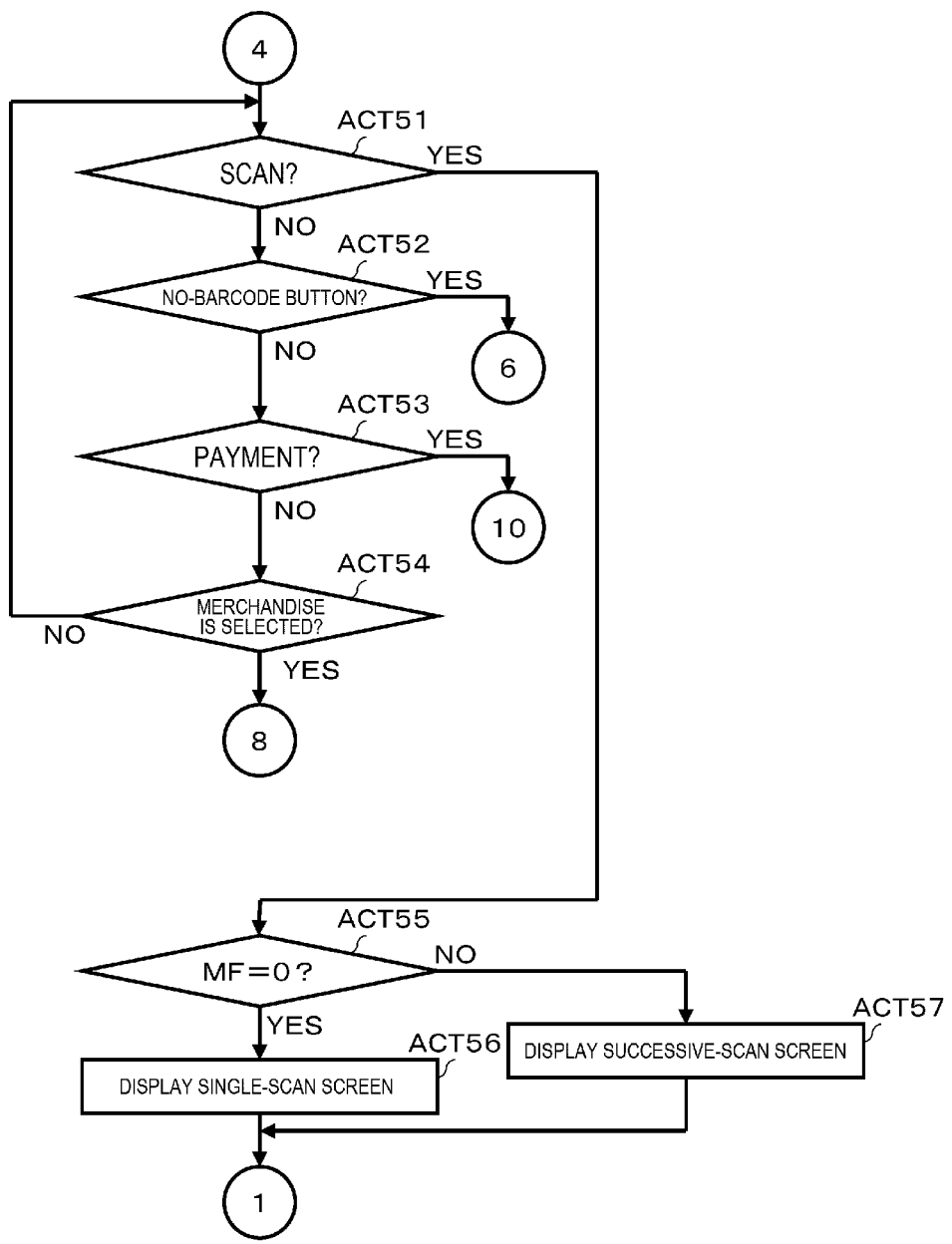

The processor 41 then proceeds to ACT 51 in FIG. 11. The processor 41 waits until the scan button BTa is pressed in ACT 51, the no-barcode button BTb is pressed in ACT 52, the payment button BTc is pressed in ACT 53, or one of the merchandise items to be purchased displayed in the detail list display part ARb is selected in ACT 54.

If the customer touches the scan button BTa, the processor 41 proceeds to ACT 55. In ACT 55, the processor 41 checks the mode flag MF. In this case, the mode flag MF is "0" and therefore the processor 41 proceeds to ACT 56. In ACT 56, the processor 41 switches the screen on the touch panel 44 from the registration screen SCd to the scan screen SCc corresponding to the single-scan mode (see FIG. 21C). The processor 41 then proceeds to ACT 12 in FIG. 9. The processor 41 starts the camera 45 again and subsequently enters into the waiting state of ACTs 13 to 16.

To change the operation mode from the single-scan mode to the successive-scan mode, the customer switches the mode changing switch SW from OFF to ON. When the mode changing switch SW is switched from OFF to ON in the waiting state of ACTs 13 to 16, the processor 41 proceeds to ACT 17. In ACT 17, the processor 41 checks the mode flag MF. In this case, the mode flag MF is "0" and therefore the processor 41 proceeds to ACT 18. In ACT 18, the processor 41 sets the mode flag MF to "1". In ACT 19, the processor 41 switches the screen on the touch panel 44 from the scan screen SCc corresponding to the single-scan mode to a scan screen SCe corresponding to the successive-scan mode (see FIG. 22A). The processor 41 then enters into the waiting state of ACTs 13 to 16.

Figure 22A:
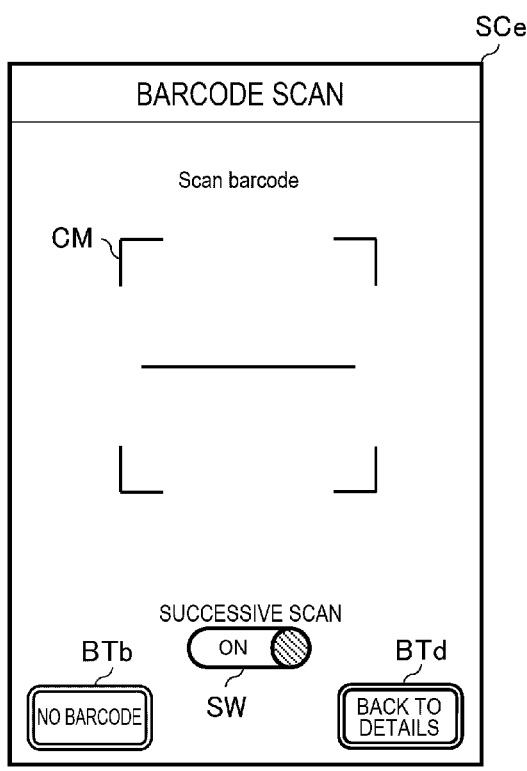
FIGS. 22A to 22D show examples of screen transition of screens.

As shown in FIG. 22A, in the scan screen SCe corresponding to the successive-scan mode, the state of the mode changing switch SW is changed from the scan screen SCc corresponding to the single-scan mode. That is, an [ON] mark shown at the mode changing switch SW indicates that the successive-scan mode is selected.

The customer changed the operation mode to the successive-scan mode holds the camera 45 over the barcode of the merchandise item to be purchased. The processor 41, which was in the waiting state of ACTs 13 to 16, proceeds to ACT 31 in FIG. 10. At this point, the mode flag MF is "1" and therefore the processor 41 proceeds to ACT 39. In ACT 39, the processor 41 controls the wireless unit 46 to send a registration notification. By this control, the wireless unit 46 wirelessly transmits a registration notification command. The registration notification command is received at the access point 27 and transmitted to the registration support server 11 via the router 26 of the POS system 20. The registration notification command includes data of the barcode read from the merchandise item to be purchased and transaction identification information.

The registration support server 11 received the registration notification command executes registration notification processing already described using FIG. 17. Thus, the processor 41 waits for the detail response command in ACT 40. On receiving the detail response command via the wireless unit 46, the processor 41 proceeds to ACT 41. In ACT 41, the processor 41 extracts the detail data with the update flag F set to "1", from the detail response command. In ACT 42, the processor 41 adds the detail data to the list area 61. In ACT 43, the processor 41 acquires the total number of items, the total amount, and the total amount of discount from the detail response command and overwrites the total area 62 with these. Also, in ACT 44, the processor 41 adds the merchandise code, the merchandise name, the price, the attribute, the number of items, the amount, and the amount of discount included in the detail data, to the current area 63. At this point, if data is already stored in the area correlated with the serial number "1" in the current area 63, the data from the serial number "1" onward are moved down to the serial number "2" onward. Then, the new data is added into the area with the serial number "1", which becomes available. In ACT 45, the processor 41 displays the merchandise name, the price, the attribute, and the number of items purchased of the data correlated with the serial number "1" in the current area 63, at a part of the scan screen SCe.

The processor 41 executes the processing of ACT 41 and thus implements the function as the extraction unit. The processor 41 executes the processing of ACT 44 and thus stores the data extracted by the extraction unit, that is, the merchandise data with the update flag F of "1", in the current area 63, which the memory unit.

Figure 22B:
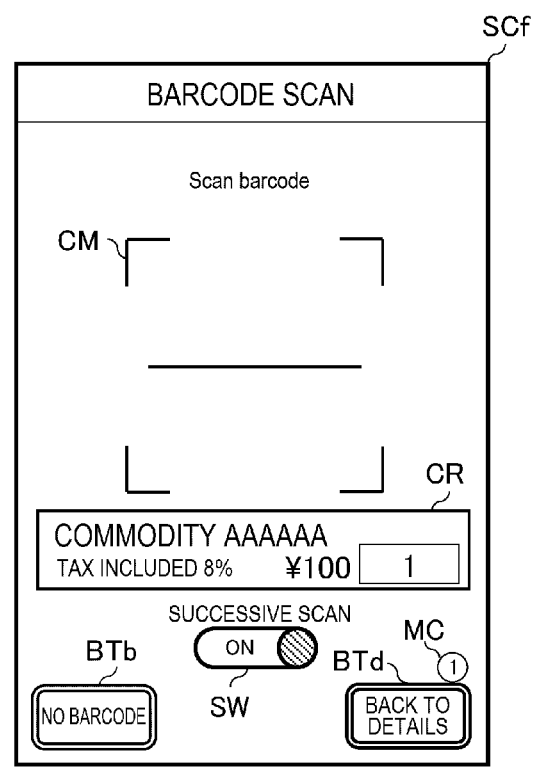

A scan screen SCf shown in FIG. 22B is a scan screen after the barcode of the merchandise item to be purchased with the merchandise name (merchandise AAAAAA) is scanned in the successive-scan mode. As shown in FIG. 22B, in the scan screen SCf, a current display area CR is secured at a part of an area that does not overlap the frame CM. In the current display area CR, the merchandise name (merchandise AAAAAA), the price (¥100), and the number of items purchased ([1]) or the like of the merchandise item to be purchased are displayed. Also, an encircled number MC is displayed above the back-to-details button BTd. The encircled number MC shows the number of data stored in the current area 63. If the customer holds the barcode of the merchandise item to be purchased over the camera 45 in such a way that the barcode fits within the frame CM in the state where such a scan screen SCf is displayed, the information terminal 40 can read the barcode. That is, the scan screen SCf is an example of the first screen.

Figure 9:
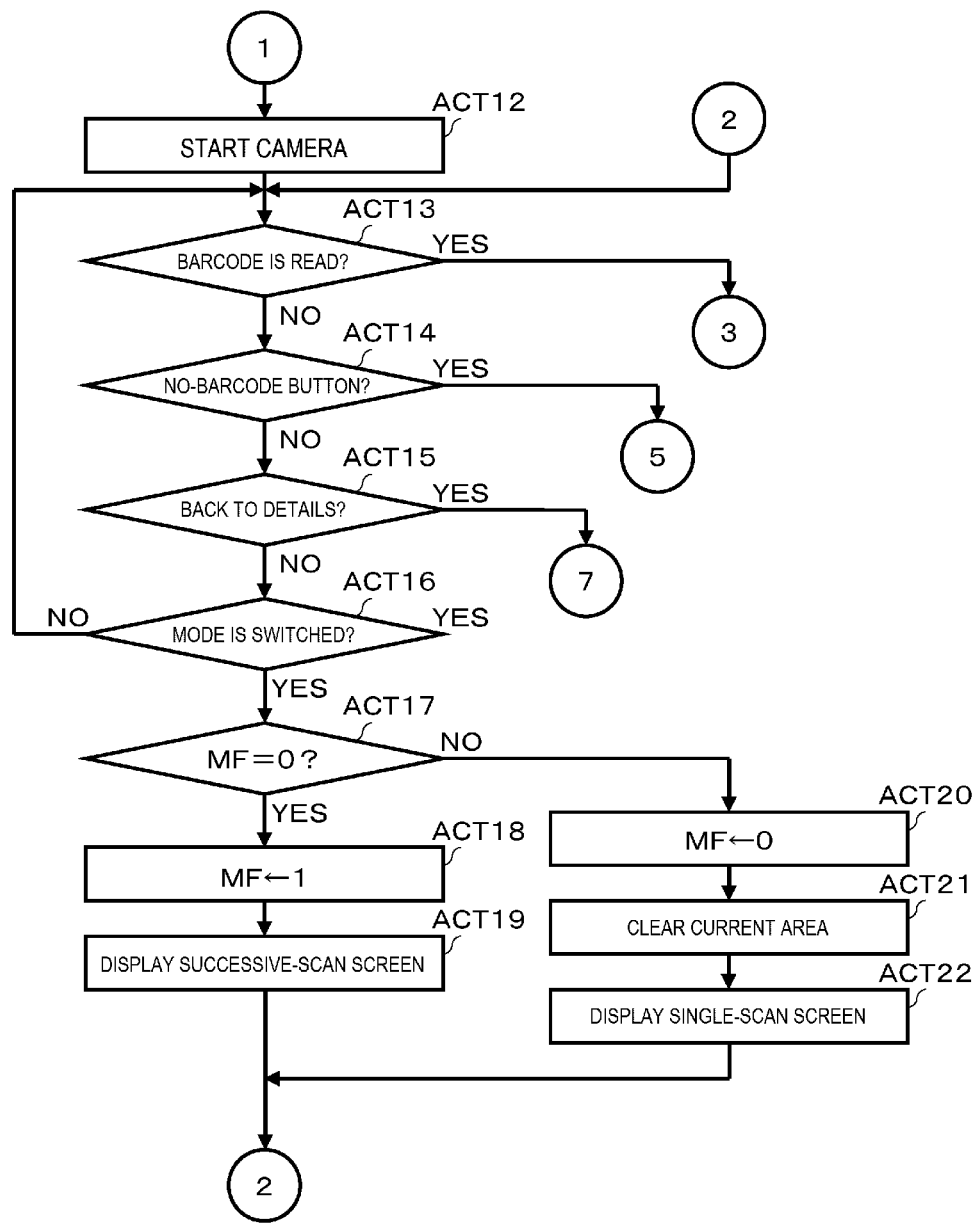

The processor 41 switched the screen on the touch panel 44 to the scan screen SCf returns to the waiting state of ACTs 13 to 16 in FIG. 9. If a barcode is read in this waiting state, the processor 41 executes the processing of ACT 31 and ACTs 39 to 45 in FIG. 10 as described above.

Figure 22C:
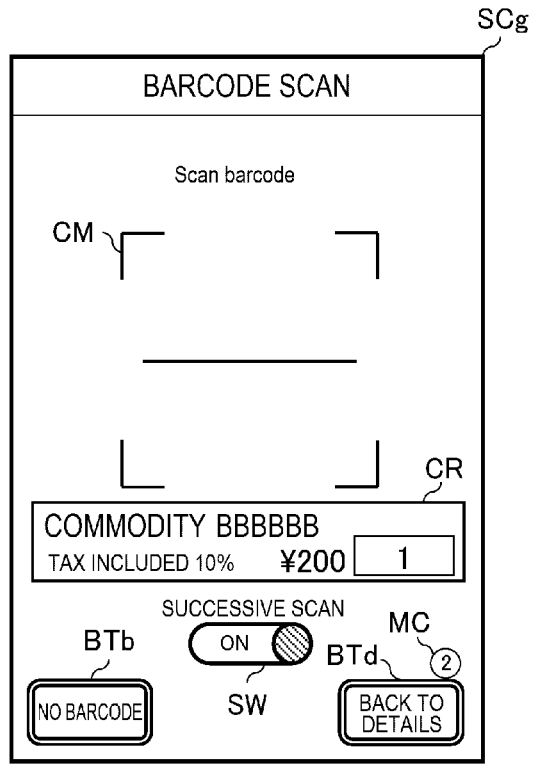

Therefore, for example, if the barcode of a merchandise item to be purchased with a merchandise name (merchandise BBBBBB) is read following the item with the merchandise name (merchandise AAAAAA), the screen on the touch panel 44 shifts to a scan screen SCg shown in FIG. 22C. That is, in the current display area CR, the merchandise name (merchandise BBBBBB), the price (¥200), and the number of items purchased ([1]) or the like are displayed. The encircled number MC is increased from "1" to "2". Based on this encircled number MC, the customer can learn the number of merchandise items that are successively scanned.

Figure 22D:
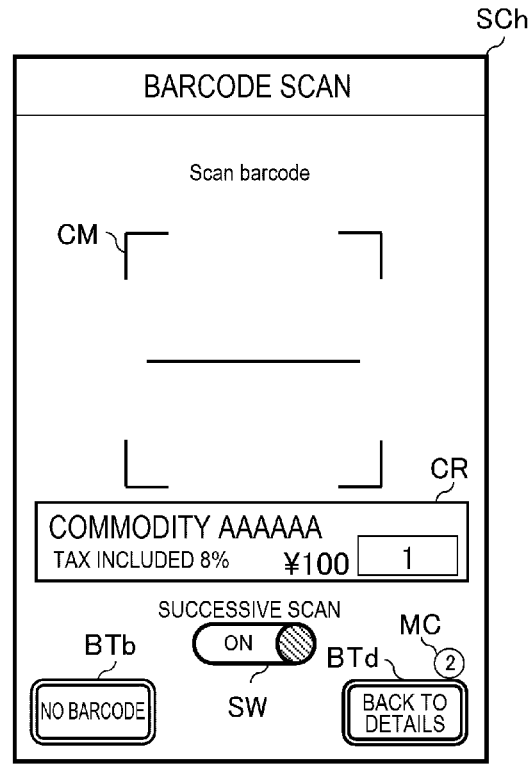

If the customer wants to check the data of the previously scanned merchandise, the customer swipes the current display area CR, for example, from left to right, facing the screen. Thus, as shown in a scan screen SCh in FIG. 22D, the content in the current display area CR is changed from the data of the item with the merchandise name (merchandise BBBBBB) to the data of the item with the merchandise name (merchandise AAAAAA). The encircled number MC is not changed.

By selecting the successive-scan mode in this way, the customer can successively scan the barcodes of merchandise to be purchased without operating the scan button BTa afterwards. At this point, the data of the latest registered item is displayed in the current display area CR and therefore the customer can check the information such as the merchandise name and the price of the item whose barcode has just been scanned. The customer can also check the information about item during the switching from the scan screen corresponding to the successive-scan mode to another screen, that is, the information about the item before the latest scanned item, by swiping the current display area CR. However, if the customer shifts from the scan screen to another screen, for example, to the registration screen (detail screen) and then returns to the scan screen corresponding to the successive-scan mode again, the customer cannot check all the items in the current display area CR. If the customer wants to check all the items, the customer touches the back-to-details button BTd.

Figure 13:
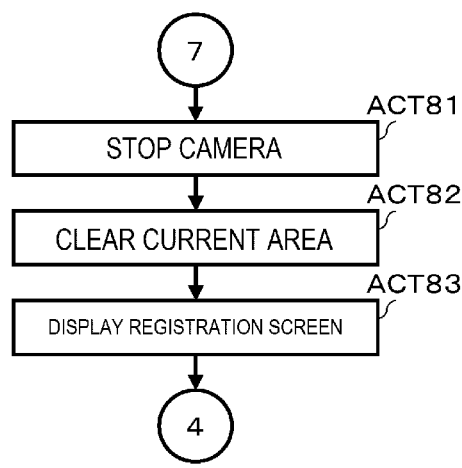
Figure 14:
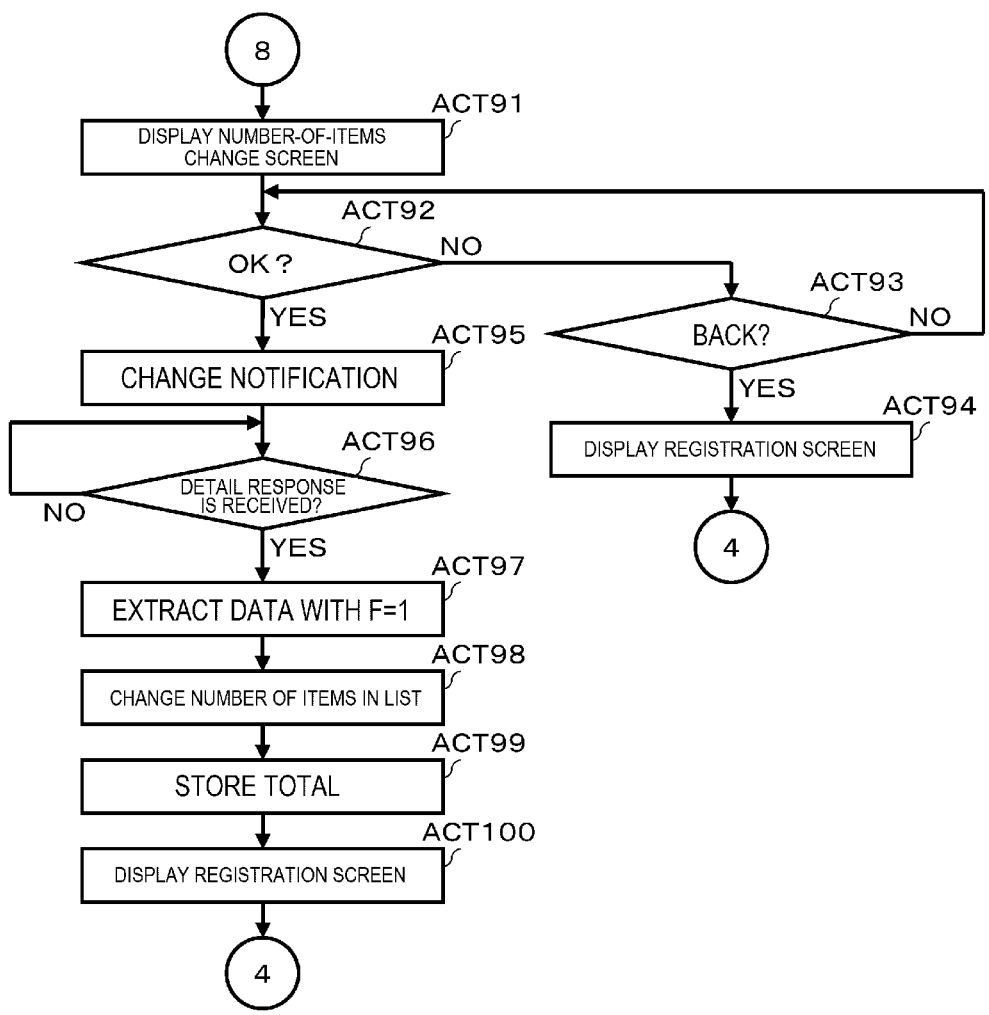

If the back-to-details button BTd is pressed in the waiting state of ACTs 13 to 16, the processor 41 proceeds to ACT 81 in FIG. 13. In ACT 81, the processor 41 stops the camera 45.

In ACT 82, the processor 41 clears the data in the current area 63. Subsequently, the processor 41 switches the screen on the touch panel 44 from the scan screen SCg corresponding to the successive-scan mode to a registration screen (merchandise detail screen) SCi (see FIG. 23A), based on the data stored in the list area 61. The processor 41 then enters into the waiting state of ACTs 51 to 54 in FIG. 11.

The registration screen SCi is a screen where the merchandise name, the price, and the like of the merchandise items registered up to this point by the customer are displayed on a per merchandise item basis. The registration screen SCi is an example of the second screen. The back-to-details button BTd in the scan screen SCe functions as the first instruction unit.

The customer who has checked the registration screen SCi touches the scan button BTa to scan the barcode of the next item to be purchased. When the scan button BTa is pressed, the processor 41 in the waiting state of ACTs 51 to 54 proceeds to ACT 55. In ACT 55, the processor 41 checks the mode flag MF. At this point, the mode flag MF is "1" and therefore the processor 41 proceeds to ACT 57. In ACT 57, the processor 41 switches the screen on the touch panel 44 from the registration screen SCi to the scan screen SCe corresponding to the successive-scan mode (see FIG. 22A). The processor 41 then proceeds to ACT 12 in FIG. 9. The processor 41 starts the camera 45 again and subsequently enters into the waiting state of ACTs 13 to 16. Therefore, the customer can again successively scan the barcodes of items to be purchased. At this point, since the current area 63 is cleared in ACT 82, the current display area CR is not displayed in the scan screen SCe. The scan button BTa in the registration screen SCi functions as the second instruction unit. The processor 41 executes the processing of ACT 82 and thus implements the function as the clearing unit.

To return the operation mode from the successive-scan mode to the single-scan mode, the customer switches the mode changing switch SW in the scan screen SCe from ON to OFF. When the mode changing switch SW is switched from ON to OFF in the waiting state of ACTs 13 to 16 in FIG. 9, the processor 41 proceeds to ACT 17. In ACT 17, the processor 41 checks the mode flag MF. In this case, the mode flag MF is "1" and therefore the processor 41 proceeds to ACT 20. In ACT 20, the processor 41 sets the mode flag MF to "0". In ACT 21, the processor 41 clears the data in the current area 63. In ACT 22, the processor 41 switches the screen on the touch panel 44 from the scan screen SCe corresponding to the successive-scan mode to the scan screen SCc corresponding to the single-scan mode. The processor 41 then enters into the waiting state of ACTs 13 to 16. Thus, if the customer, in the successive-scan mode, switches the mode changing switch SW to select the single-scan mode without touching the back-to-details button BTd, again, the data in the current area 63 is cleared.

In this way, the processor 41 executes the processing of ACT 18 or ACT 20 in FIG. 9 in cooperation with the mode changing switch SW and thus implements the function as the switching unit. The processor 41 also executes the processing of ACT 19 or ACT 21 and thus implements the function as the control unit.

The case where a barcode is not attached to a merchandise item to be purchased will now be described. A barcode may not be attached to some items such as fresh food. If a barcode is not attached to the merchandise item to be purchased, the customer touches the no-barcode button BTb.

Figure 12:
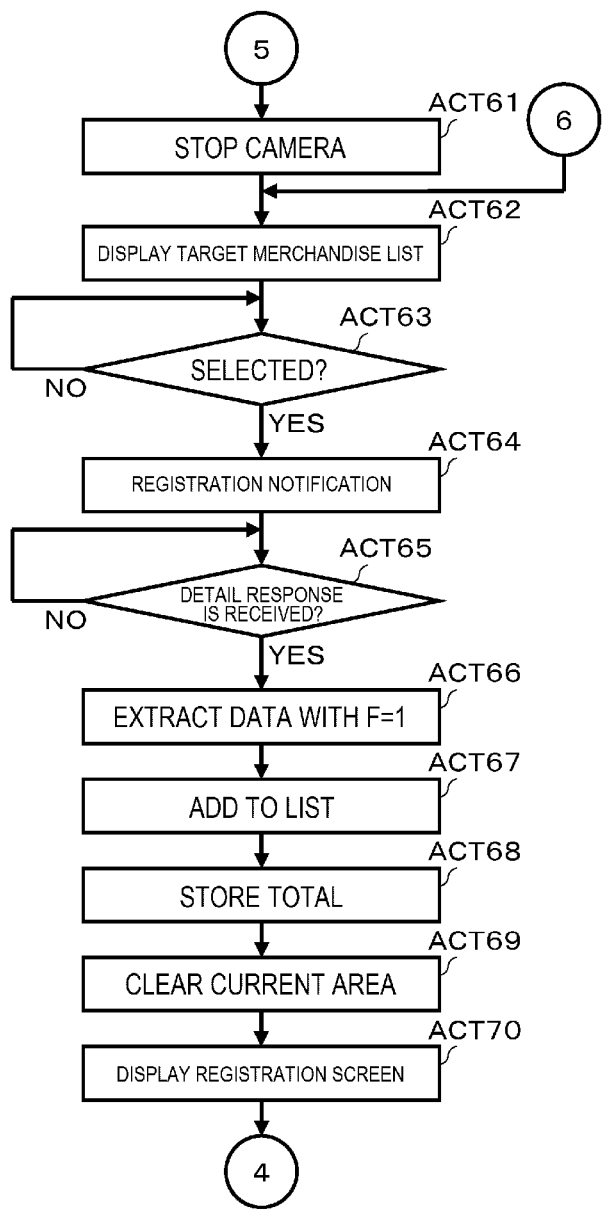

If the no-barcode button BTb is pressed in the waiting state of ACTs 13 to 16, where the scan screen corresponding to the single-scan mode or the scan screen corresponding to the successive-scan mode is displayed on the touch panel 44 and where the camera 45 is started, the processor 41 proceeds to ACT 61 in FIG. 12. In ACT 61, the processor 41 stops the camera 45. The processor 41 subsequently proceeds to ACT 62. If the no-barcode button BTb is pressed in the waiting state of ACTs 9 and 10 or in the waiting state of ACTs 51 to 54, where the registration screen is displayed on the touch panel 44 and where the camera 45 is stopped, the processor 41 skips the processing of ACT 61 and proceeds to ACT 62. In ACT 62, the processor 41 displays a no-barcode merchandise target list on the touch panel 44. The processor 41 then waits until a merchandise item is selected.

The customer touches and selects an item from the list. After the merchandise item to be purchased is selected, the processor 41 proceeds to ACT 64. The processor 41 controls the wireless unit 46 to send a registration notification. By this control, the wireless unit 46 wirelessly transmits a registration notification command. The registration notification command is received at the access point 27 and transmitted to the registration support server 11 via the router 26 of the POS system 20. The registration notification command includes the merchandise code of the selected merchandise item and the transaction identification code.

The registration support server 11 then executes registration notification processing already described using FIG. 17. Thus, the processor 41 waits for the detail response command in ACT 65. On receiving the detail response command via the wireless unit 46, the processor 41 proceeds to ACT 66. In ACT 66, the processor 41 extracts the detail data with the update flag F set to "1", from the detail response command. In ACT 67, the processor 41 adds the detail data to the list area 61. In ACT 68, the processor 41 acquires the total number of items, the total amount, and the total amount of discount from the detail response command and overwrites the total area 62 with these. Also, in ACT 69, the processor 41 clears the data in the current area 63. Then, in ACT 70, the processor 41 switches the screen on the touch panel 44 to the registration screen. At this point, the merchandise name, the price, the number of items purchased, and the like of the no-barcode merchandise are added into the detail list display part ARb in the registration screen. The total number of items and the total amount in the total display part ARa are increased by the amount corresponding to the no-barcode merchandise.

Subsequently, the processor 41 enters into the waiting state of ACTs 51 to 54 of the FIG. 11. Therefore, if the single-scan mode is selected and the customer touches the scan button BTa to continue to read the barcode of the merchandise to be purchased, the screen on the touch panel 44 switches from the registration screen to the scan screen SCc corresponding to the single-scan mode. However, if the successive-scan mode is selected, the screen on the touch panel 44 switches from the registration screen to the scan screen SCe corresponding to the successive-scan mode. Thus, the customer can again successively scan the barcodes of the merchandise item to be purchased. At this point, since the current area 63 is cleared in ACT 69, the current display area CR is not displayed in the scan screen SCe.

The successive-scan mode is effective in the case of purchasing a plurality of items of the same merchandise. For example, it is assumed that the customer purchases three items of a certain merchandise. In the case of the single-scan mode, the customer is requested to enter the scan button BTa each time to have the barcode of the merchandise read once. Therefore, the customer finds it troublesome. In contrast, in the case of the successive-scan mode, the customer can enter the scan button BTa at first and then may be required to read the barcodes of the three items successively. Alternatively, the customer may be required to read the barcode of one item three times successively. Therefore, the customer does not find it troublesome. At this point, the display in the current display area CR does not change, whereas the encircled number MC changes from "1" to "2" and then to "3". Based on such changes in the encircled number MC, the customer can recognize that the three items were correctly registered.

However, if the customer purchases a large number of items of the same merchandise at a time, the customer causes the information terminal 40 to read the same barcode repeatedly and therefore may find it troublesome. In such a case, the customer may change the number of items of the merchandise displayed in the registration screen to the number of items purchased. The function of changing the number of items purchased will now be described.

Figure 23A:
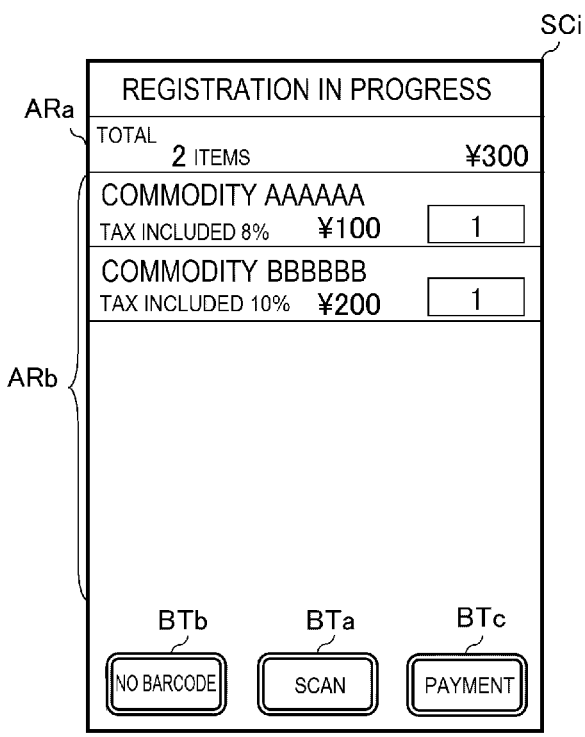

For example, if the registration screen SCi shown in FIG. 23A is displayed on the touch panel 44 and the customer changes the number of items purchased corresponding to the merchandise name "merchandise AAAAAA" from "1" to "8", the customer taps the field where the merchandise name "merchandise AAAAAA" is displayed, and thus selects the target merchandise. Thus, the processor 41, which is in the waiting state of ACTs 51 to 54 in FIG. 11, proceeds to ACT 91 in FIG. 14.

Figure 23B:
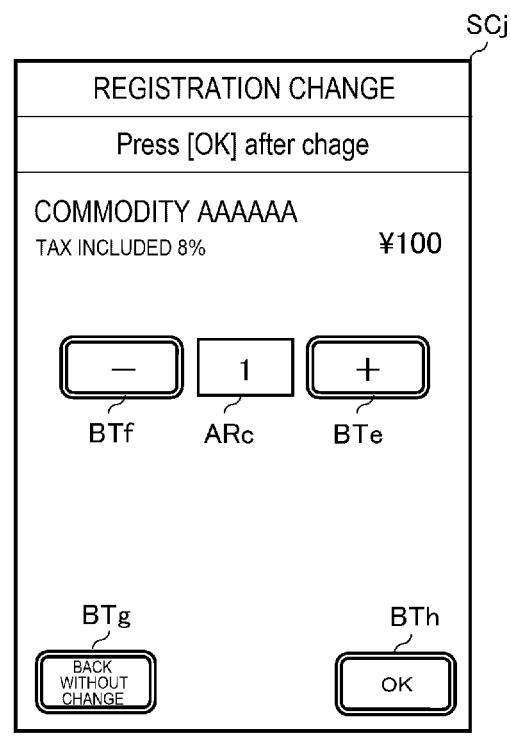

In ACT 91, the processor 41 switches the screen on the touch panel 44 from the registration screen SCi to a number-of-items change screen SCj (see FIG. 23B). As shown in FIG. 23B, in the number-of-items change screen SCj, the merchandise name, the price, and the like of the number-of-items change target merchandise, and the number of items purchased as of the current point in an area ARc, are displayed. Also, an add button BTe is arranged on one side of the area ARc and a subtract button BTf is arranged on the other side. Moreover, a back-without-change button BTg and an OK button BTh are arranged.

The customer who has checked the number-of-items change screen SCj touches the add button BTe seven times. Thus, as shown in a number-of-items change screen SCk in FIG. 23C, the numeric value in the area ARc changes to "8". Therefore, the customer touches the OK button BTh.

The processor 41 waits until the OK button BTh is pressed in ACT 92 or the back-without-change button BTg is pressed in ACT 93. If the OK button BTh is pressed in the waiting state of ACTs 92 and 93, the processor 41 controls the wireless unit 46 to send a change notification in ACT 95. By this control, the wireless unit 46 wirelessly transmits a change notification command. The change notification command is received at the access point 27 and transmitted to the registration support server 11 via the router 26 of the POS system 20. The change notification command includes the number of items in the area ARc, that is, the number of items purchased after the change, along with the merchandise code of the change target merchandise. The change notification command also includes the transaction identification code stored in the information terminal 40.

The registration support server 11 received the change notification command executes change notification processing.

Figure 18:
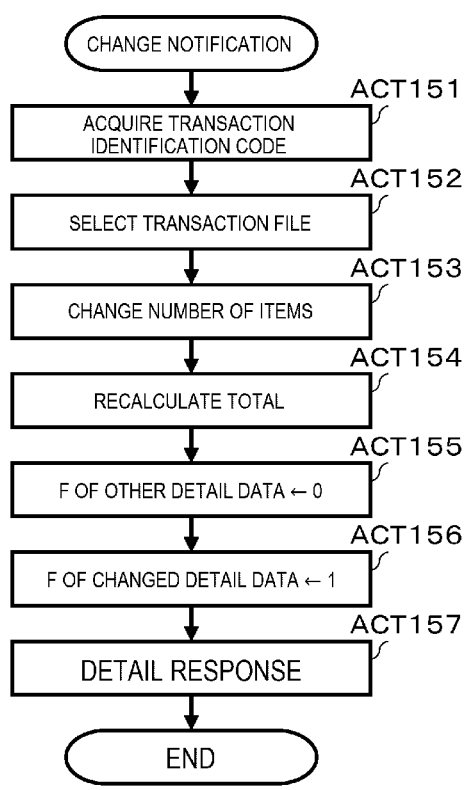
FIG. 18 is a flowchart of change notification processing.

FIG. 18 is a flowchart of the change notification processing. On receiving the change notification command via the communication interface 115, the processor 111 of the registration support server 11 acquires the transaction identification code from the change notification command in ACT 151. In ACT 152, the processor 111 selects the transaction file 51 where the transaction identification code is saved.

In ACT 153, the processor 111 selects the detail data corresponding to the merchandise code included in the change notification command, from among the detail data stored in the transaction file 51, and changes the number of items purchased of this detail data to the number of items purchased included in the change notification command. In ACT 154, the processor 111 recalculates the total number of items and the total amount or the like in the transaction file.

In ACT 155, the processor 111 sets the update flag F of the other detail data to "0". In ACT 156, the processor 111 sets the update flag F of the detail data with the change number of items purchased to "1". In ACT 157, the processor 111 transmits a detail response command to the information terminal 40 that is the transmission source of the change notification command.

Referring back to FIG. 14, the processor 41 that controlled the transmission of the change notification command now waits for the detail response command in ACT 96. On receiving the detail response command via the wireless unit 46, the processor 41 proceeds to ACT 97. In ACT 97, the processor 41 extracts the detail data with the update flag F set to "1" from the detail response command. In ACT 98, the processor 41 changes the number of items included in the data in the list area 61 including the same merchandise code as the detail data, to the changed number of items purchased. In ACT 99, the processor 41 acquires the total number of items, the total amount, and the total amount of discount from the detail response command and overwrites the total area 62 with these.

In ACT 100, the processor 41 switches the screen on the touch panel 44 from the number-of-items change screen SCk to a registration screen SCl (see FIG. 23D). The registration screen SCl is an example of the screen corresponding to the case where the number of items purchased with the merchandise name "merchandise AAAAAA" is changed from "1" to "8". The processor 41 then enters into the waiting state of ACTs 51 to 54 in FIG. 11. Therefore, if the single-scan mode is selected and the customer touches the scan button BTa to continue to read the barcode of the merchandise item to be purchased, the screen on the touch panel 44 switches from the registration screen to the scan screen SCc corresponding to the single-scan mode. However, if the successive-scan mode is selected, the screen on the touch panel 44 switches from the registration screen to the scan screen SCe corresponding to the successive-scan mode. Thus, the customer can again successively scan the barcodes of the merchandise items to be purchased. At this point, since the current area 63 is cleared, the current display area CR is not displayed in the scan screen SCe.

Incidentally, the number-of-items change screen SCj can also be used to cancel the purchase of registered items during the shopping. The customer taps the field where the merchandise name of the item that is to be cancelled is displayed, in the registration screen, and thus selects the target merchandise. Thus, the screen on the touch panel 44 switches from the registration screen to the number-of-items change screen SCj. Therefore, the customer touches the subtract button BTf and changes the numeric value in the area ARc to "0". The customer then touches the OK button BTh. Thus, the processor 41 executes the processing of ACTs 95 to 100 in FIG. 14 as described above. Consequently, the number of items purchased changes to "0" and therefore this merchandise item is eliminated from the merchandise registered for purchase. Preferably, the merchandise item for which the number of items purchased has been changed to "0" may be left in the registration screen, for example, by superimposing a cancellation line over the merchandise name or the like or by displaying the characters indicating this item in a different color from other merchandise with the number of items purchased of "1" or greater.

The customer finished the shopping touches the payment button BTc in the registration screen SC1.

Figure 15:
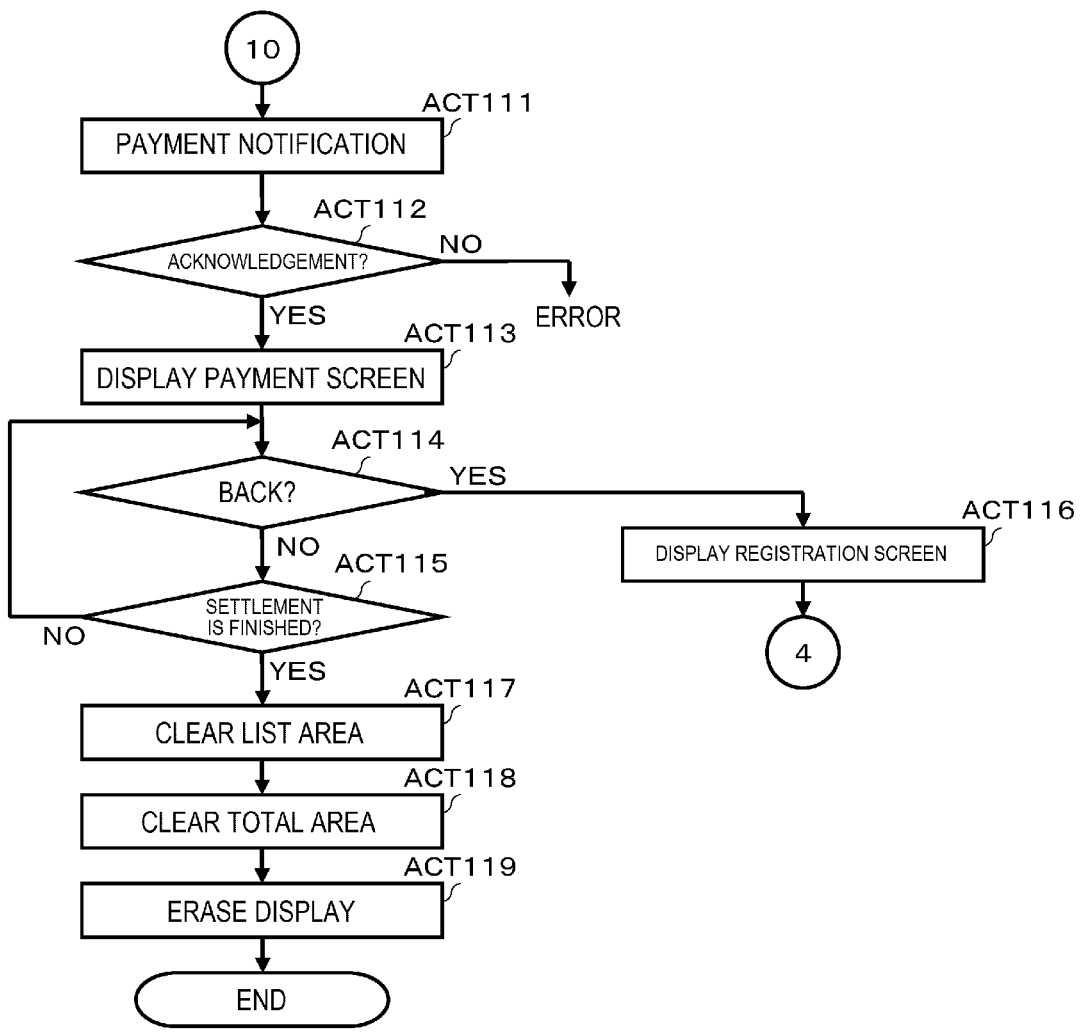

When the payment button BTc is pressed, the processor 41 in the waiting state of ACTs 51 to 54 in FIG. 11 proceeds to ACT 111 in FIG. 15. In ACT 111, the processor 41 controls the wireless unit 46 to send a payment notification. By this control, the wireless unit 46 wirelessly transmits a payment notification command. The payment notification command is received at the access point 27 and transmitted to the registration support server 11 via the router 26 of the POS system 20. The payment notification command includes the transaction identification code.

The registration support server 11 then executes payment notification processing.

Figure 19:
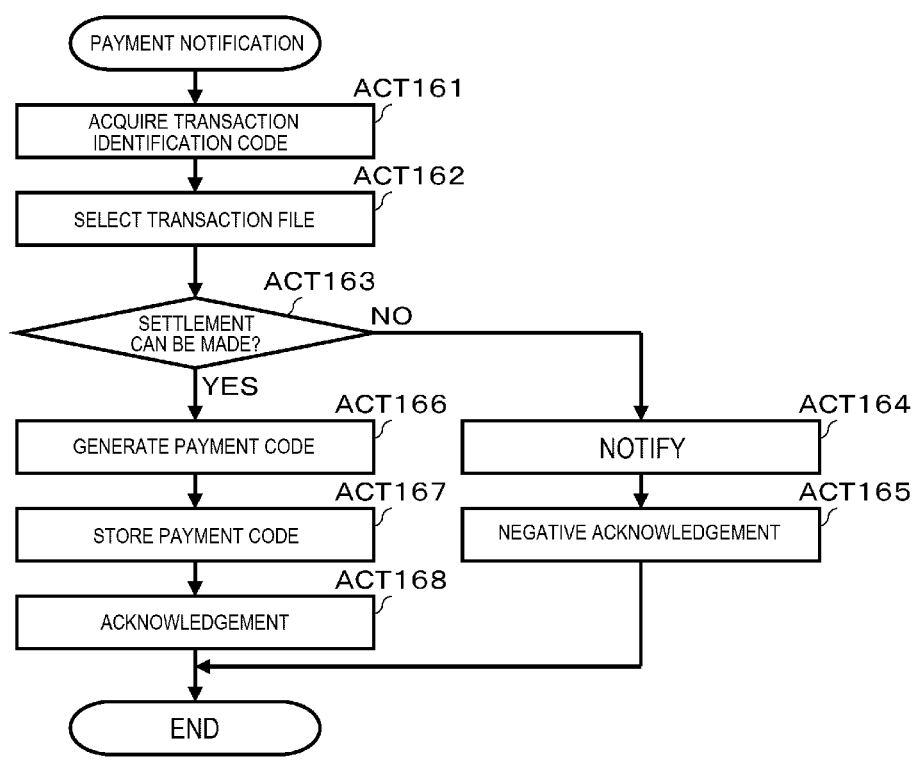
FIG. 19 is a flowchart of payment notification processing.

FIG. 19 is a flowchart of the payment notification processing. On receiving the payment notification command via the communication interface 115, the processor 111 of the registration support server 11 acquires the transaction identification code from the payment notification command in ACT 161. In ACT 162, the processor 111 selects the transaction file 51 where this transaction identification code is saved.

In ACT 163, the processor 111 analyzes the data saved in the transaction file 51 and checks whether the settlement can be made or not. For example, for a merchandise item whose merchandise name, price or the like cannot be read out in correlation with the merchandise code, detail data in an error state is left. In this case, the settlement cannot be made. If the settlement cannot be made, the processor 111 proceeds to ACT 164. The processor 111 notifies a store terminal used by an attendant for monitoring, that the customer that declared for settlement including an error merchandise item. In ACT 165, the processor 111 transmits a negative acknowledgement command to the information terminal 40 that sent the payment notification command. The attendant is thus notified and takes measures such as checking the items registered by the customer.

However, if the settlement can be made, the processor 111 proceeds to ACT 166. In ACT 166, the processor 111 generates a unique payment code. In ACT 167, the processor 111 saves the payment code in the transaction file 51. In ACT 168, the processor 111 transmits an acknowledgement command to the information terminal 40 that sent the payment notification command.

Referring back to FIG. 15, the processor 41 waits for the response command in ACT 112. If the processor 41 receives the negative acknowledgement command from the registration support server 11, the processor 41 executes error processing. For example, the processor 41 displays an error message such as "Settlement is not available by self-service. Make a settlement at a staffed payment machine" on the touch panel 44.

If the processor 41 receives the acknowledgement command, the processor 41 proceeds to ACT 113. In ACT 113, the processor 41 switches the screen on the touch panel 44 from the registration screen SCi to a payment screen SCm (see FIG. 24). As shown in FIG. 24, in the payment screen SCm, the payment code is displayed in the form of a barcode BC. Also, a back button BTi is arranged.

The processor 41 waits until the back button BTi is pressed in ACT 114 or a settlement finish response command is received in ACT 115. If the back button BTi is pressed, the processor 41 proceeds to ACT 116. In ACT 116, the processor 41 returns the screen on the touch panel 44 from the payment screen SCm to the immediately preceding registration screen SC1. The processor 41 enters into the waiting state of ACTs 51 to 54.

The settlement finish response command is sent from the registration support server 11 when the customer finishes the payment at the dedicated payment machine 24. The customer checked the payment screen SCm scans the barcode BC in the payment screen SCm with the scanner of the dedicated payment machine 24. Thus, a settlement request command is transmitted from the dedicated payment machine 24 to the registration support server 11. The settlement request command includes the data of the barcode BC, that is, the payment code.

Figure 20:
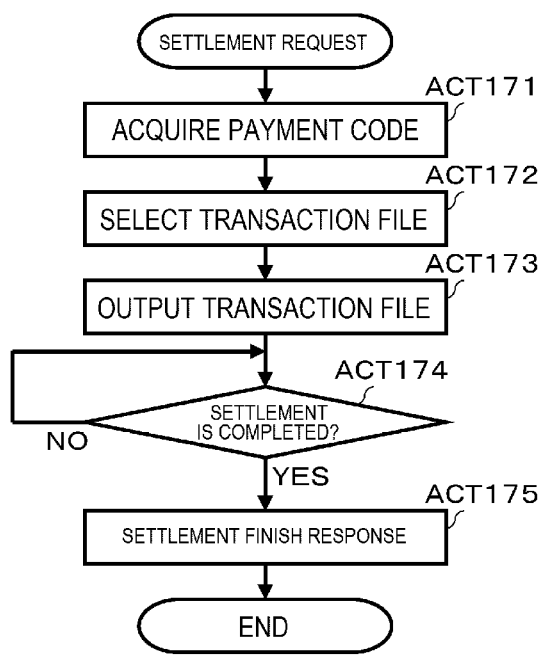
FIG. 20 is a flowchart of settlement request processing.

The processor 111 of the registration support server 11 starts settlement request processing according to the procedures shown in FIG. 20. That is, in ACT 171, the processor 111 acquires the payment code from the settlement request command. In ACT 172, the processor 111 selects the transaction file 51 where the corresponding transaction identification code is saved.

In ACT 173, the processor 111 transmits the data of the transaction file 51 to the dedicated payment machine 24 that sent the settlement request command. Thus, the content of the transaction is displayed on the display of the dedicated payment machine 24. Therefore, the customer checks the transaction content and then pays the price accordingly. On completion of the payment of the price, a settlement completion command is transmitted from the dedicated payment machine 24 to the registration support server.

The processor 111 waits for the settlement completion command in ACT 174. On receiving the settlement completion command, the processor 111 proceeds to ACT 175. In ACT 175, the processor 111 transmits a settlement finish response command to the information terminal 40 specified by the transaction identification code in the transaction file 51.

On receiving the settlement finish response command, the processor 41 of the information terminal 40 proceeds to ACT 117. In ACT 117, the processor 41 clears the list area 61. In ACT 118, the processor 41 clears the total area 62. Subsequently, in ACT 119, the processor 41 erases the payment screen SCm. Then, the self-service shopping using the information terminal 40 ends.

Advantageous Effects of Information Terminal

As described above, if the customer switches the mode changing switch SW in the scan screen SCc displayed on the touch panel 44 of the information terminal 40 from OFF to ON, the operation mode is changed from the single-scan mode to the successive-scan mode. When the operation mode is changed to the successive-scan mode, the screen on the touch panel 44 changes to the scan screen SCe corresponding to the successive-scan mode. In the scan screen SCe, the frame CM indicating the code reading area is displayed. Therefore, the customer holds the camera 45 of the information terminal 40 over the merchandise item to be purchased in such a way that the barcode fits within the frame CM. Thus, the barcode is read by the function of the reading unit of the information terminal 40. The merchandise data such as the merchandise name and the price of the merchandise specified by this barcode is displayed in the current display area CR, which is a part of the scan screen SCe. At this point, the frame CM is still displayed in the scan screen SCe. Therefore, the customer can cause the camera to read the barcode of the next item to be purchased without pressing any particular button for starting another input operation. In this way, by selecting the successive-scan mode, the customer can execute the barcode reading operations on the merchandise items to be purchased without finding it troublesome.

To return from the successive-scan mode to the single-scan mode, the customer can switch the mode changing switch SW in the scan screen SCe from ON to OFF. Therefore, the customer can switch the operation mode between the single-scan mode and the successive-scan mode by a simple operation.

The merchandise data displayed in the current display area CR in the scan screen SCe is stored in the current area 63 in the order of registration. If the customer swipes the current display area CR, the display content in the current display area CR is changed to the data of the immediately preceding registered item. Thus, the customer can easily check not only the data of the latest registered item but also the data of a previously scanned item in the scan screen SCe. Also, the number of successively scanned merchandise items is displayed at a part of the scan screen SCe. Therefore, the customer can easily grasp information about how many items were successively scanned.

The information terminal 40 extracts detail data with the update flag F set to "1" from among detail data sent from the registration support server 11, which is the higher-level machine, and stores the extracted detail data in the current area 63, which is a memory unit. Therefore, the processing load on the processor 41 can be reduced, compared with the case where the data in the current area 63 is rewritten with all of the detail data every time the detail data is sent from the registration support server 11.

Also, for example, if the customer touches the back-to-details button BTd in the scan screen SCe and thus changes the screen on the touch panel 44 to the registration screen SCi, the information terminal 40 clears the current area 63. Therefore, if the customer subsequently touches the scan button BTa, the screen on the touch panel 44 changes to the scan screen SCe corresponding to the successive-scan mode, but the current display area CR is not displayed because the current area 63 is cleared. Similarly, if the customer touches the no-barcode button BTb in the successive-scan mode, or if the customer switches the mode changing switch from the successive-scan mode to the single-scan mode once and then switches the mode changing switch to the successive-scan mode again, the information terminal 40 clears the current area 63. In this way, the merchandise data stored in the current area 63 is limited to the merchandise items whose barcodes were successively read. Therefore, the memory capacity of the current area 63 can be made smaller than the list area 61.

MODIFICATION EXAMPLES

In an embodiment, a smartphone is employed as the information terminal 40. However, the information terminal 40 may be, for example, a tablet terminal attached to a shopping cart or a portable terminal lent to the customer by the store. In this case, the processing of ACTs 1 to 5 in FIG. 8 may be omitted. Specifically, a declaration button to start shopping is displayed in an initial screen on the tablet terminal or the portable terminal. If the customer touches the declaration button, the processor 41 gives YES in the determination in ACT 6 and starts processing from ACT 7. Using such a configuration enables the application of the tablet terminal or the portable terminal as the information terminal 40.

In an embodiment, the registration support server 11 includes, in the detail response command, detail data corresponding to the number of detail data n saved in the transaction file 51 and transmits this to the information terminal 40. In this respect, the processor 111 of the registration support server 11 may extract the detail data with the update flag F set to "1", include this detail data in the detail response command, and transmit this to the information terminal 40. Thus, the information terminal 40 can omit the processing of ACT 35, ACT 41, ACT 66, and ACT 97.

In an embodiment, the processor 41 of the information terminal 40 determines whether the operation mode is the single-scan mode or the successive-scan mode and displays the scan screen SCc in the case of the single-scan mode and displays the scan screen SCe in the case of the successive-scan mode. In this respect, the registration support server 11 determines the operation mode of the information terminal 40. In the case of the single-scan mode, the registration support server 11 provides the information terminal 40 with information that is necessary for displaying the scan screen SCc. For the case of the successive-scan mode, the registration support server 11 provides the information terminal 40 with information that is necessary for displaying the scan screen SCe. Employing such a configuration can achieve the advantageous effects of the embodiment as the merchandise registration system 100 including the registration support server 11 and the information terminal 40.

In an embodiment, the case where the number of items of a registered merchandise item type is changed on the number-of-items change screen SCj is described as an example. However, to change the number of items, the number-of-items change screen SCj need not necessarily be used. For example, the number of items purchased displayed in the detail list display part ARb in the registration screen SCi may be displayed in a cell in a pull-down list, and the number of items purchased after the change may be selected from the pull-down list. Alternatively, a numeric keypad screen may be displayed instead of the number-of-items change screen SCj, and the number of items purchased after the change may be inputted via numeric keys.

In an embodiment, the processor 41 clears the data in the current area 63 in the processing of ACT 21, ACT 69, or ACT 82. However, the timing of clearing the data in the current area 63 is not limited to this example. The data in the current area 63 may be cleared, for example, at the timing when the scan button BTa is pressed in ACT 51 in FIG. 11. Also, the data in the current area 63 may be cleared, for example, before or after the mode flag MF is changed to "1" in ACT 18 in FIG. 9.

The code read by the reading unit of the information terminal 40 is not limited to a barcode. For example, a two-dimensional code formed by coding information for specifying the merchandise may be employed.

The registration support server 11 need not be a single server. The functions of the registration support server 11 may be distributed among a plurality of servers. The registration support server 11 may not use cloud computing. For example, the store server 21 or another server may have the functions of the registration support server 11.

While certain embodiments have been described, these embodiments are presented simply as examples and are not intended to limit the scope of the present disclosure. These novel embodiments can be carried out in various other forms and can include various omissions, replacements, and modifications without departing from the spirit and scope of the present disclosure. These embodiments and the modifications thereof are included in the spirit and scope of the present disclosure and also included in the scope of the claims and equivalents thereof.

What is claimed is:

1. An information terminal, comprising:
   a communication interface connectable to a server;
   a camera to read a code for identifying an item of merchandise;
   a display to display a first screen for supporting the reading of the code with the camera;
   a processor configured to:
   transmit the code read by the camera to the server and receive merchandise data corresponding to the code from the server;
   switch between a successive-reading mode in which codes can be successively read by the camera and a single-reading mode in which codes cannot be successively read when a setting of a mode operator displayed on the first screen is changed by a user;
   cause the display to display the merchandise data received from the server in a part of the first screen and permit successive reading of codes by the camera when in the successive-reading mode; and
   cause the display to display the merchandise data received from the server in a second screen that is different from the first screen when in the single-reading mode.

2. The information terminal according to claim 1, further comprising:
   a memory unit configured to sequentially store the merchandise data corresponding to each code read by the camera, wherein
   when in the successive-reading mode, the merchandise data corresponding to the most recently read code that is stored in the memory unit is displayed in the first part of the first screen until a go-back instruction is received from the user via the first screen.

3. The information terminal according to claim 2, wherein, after the go-back instruction is received, merchandise data corresponding to a previously read code that is stored in the memory unit is displayed on the display.

4. The information terminal according to claim 3, wherein the processor is further configured to extract merchandise data corresponding to the previously read code from the memory unit in response to the go-back instruction.

5. The information terminal according to claim 2, wherein the processor is further configured to:
   issue an instruction to the display to transition from the first screen to the second screen when the mode operator is changed from a first state to a second state;
   issue an instruction to the display to transition from the second screen to the first screen when the mode operator is changed from the second state to the first state; and
   clear the merchandise data stored in the memory unit whenever the state of the mode operator is changed.

6. The information terminal according to claim 5, wherein the display is a touch panel, and
   the mode operator is a slider button with two positions corresponding to the first and second states.

7. The information terminal according to claim 1, wherein the mode operator is a slider button with two positions.

8. A method for an information terminal in a semi-self-service retail transaction processing system, the method comprising:
   displaying a first screen for supporting a reading of a merchandise code with a camera;
   transmitting the merchandise code read by the camera to a server and receiving merchandise data corresponding to the merchandise code from the server;
   switching between a successive-reading mode in which merchandise codes can be successively read by the camera and a single-reading mode in which merchandise codes cannot be successively read based on a setting of a mode operator displayed on the first screen;
   causing the merchandise data received from the server to be displayed in a part of the first screen and permitting successive reading of merchandise codes by the camera when in the successive-reading mode; and
   causing the merchandise data received from the server to be displayed in a second screen that is different from the first screen when in the single-reading mode.

9. The method according to claim 8, wherein, when in the successive-reading mode, the merchandise data corresponding to the most recently read code is displayed in the first part of the first screen until a go-back instruction is received from the user via the first screen.

10. The method according to claim 9, wherein, after the go-back instruction is received, merchandise data corresponding to a previously read code is displayed.

11. The method according to claim 10, further comprising:
    extracting merchandise data corresponding to the previously read code from a memory unit in response to the go-back instruction.

12. The method according to claim 9, further comprising:
    issuing an instruction to transition from the first screen to the second screen when the mode operator is changed from a first state to a second state;
    issuing an instruction to transition from the second screen to the first screen when the mode operator is changed from the second state to the first state; and
    clearing the merchandise data stored in a memory unit whenever the state of the mode operator is changed.

13. The method according to claim 12, wherein the mode operator is a slider button with two positions corresponding to the first and second states.

14. The method according to claim 8, wherein the mode operator is a slider button with two positions.

15. A non-transitory, computer-readable medium storing program instructions which when executed by an information terminal cause the information terminal to perform a method comprising:
    displaying a first screen for supporting a reading of a merchandise code with a camera;
    transmitting the merchandise code read by the camera to a server and receiving merchandise data corresponding to the merchandise code from the server;
    switching between a successive-reading mode in which merchandise codes can be successively read by the camera and a single-reading mode in which merchandise codes cannot be successively read based on a setting of a mode operator displayed on the first screen;
    causing the merchandise data received from the server to be displayed in a part of the first screen and permitting successive reading of merchandise codes by the camera when in the successive-reading mode; and
    causing the merchandise data received from the server to be displayed in a second screen that is different from the first screen when in the single-reading mode.

16. The non-transitory, computer-readable medium according to claim 15, wherein, when in the successive-reading mode, the merchandise data corresponding to the most recently read code is displayed in the first part of the first screen until a go-back instruction is received from the user via the first screen.

17. The non-transitory, computer-readable medium according to claim 15, wherein, after the go-back instruction is received, merchandise data corresponding to a previously read code is displayed.

18. The non-transitory, computer-readable medium according to claim 17, the method further comprising:
   extracting merchandise data corresponding to the previously read code from a memory unit in response to the go-back instruction.

19. The non-transitory, computer-readable medium according to claim 17, the method further comprising:
   issuing an instruction to transition from the first screen to the second screen when the mode operator is changed from a first state to a second state;
   issuing an instruction to transition from the second screen to the first screen when the mode operator is changed from the second state to the first state; and
   clearing the merchandise data stored in a memory unit whenever the state of the mode operator is changed.

20. The non-transitory, computer-readable medium according to claim 15, wherein the mode operator is a slider button with two positions.

\* \* \* \* \*